United States Patent
Lin et al.

(10) Patent No.: US 12,293,465 B2
(45) Date of Patent: May 6, 2025

(54) METHOD AND APPARATUS FOR CONSTRUCTING THREE-DIMENSIONAL FACE MESH, DEVICE, AND STORAGE MEDIUM

(71) Applicant: Tencent Technology (Shenzhen) Company Limited, Shenzhen (CN)

(72) Inventors: Xiangkai Lin, Shenzhen (CN); Sheng Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 458 days.

(21) Appl. No.: 17/751,496

(22) Filed: May 23, 2022

(65) Prior Publication Data

US 2022/0284679 A1    Sep. 8, 2022

Related U.S. Application Data

(63) Continuation of application No. PCT/CN2021/097567, filed on Jun. 1, 2021.

(30) Foreign Application Priority Data

Jul. 16, 2020  (CN) .......................... 202010685183.0

(51) Int. Cl.
G06T 17/20    (2006.01)
G06T 3/40     (2024.01)
(Continued)

(52) U.S. Cl.
CPC ............. *G06T 17/205* (2013.01); *G06T 3/40* (2013.01); *G06T 7/64* (2017.01); *G06T 7/70* (2017.01);
(Continued)

(58) Field of Classification Search
None
See application file for complete search history.

(56) References Cited

U.S. PATENT DOCUMENTS

2015/0325044 A1  11/2015  Lebovitz
2016/0373724 A1  12/2016  Lysenkov
(Continued)

FOREIGN PATENT DOCUMENTS

CN    102663810 A    9/2012
CN    106327482 A    1/2017
(Continued)

OTHER PUBLICATIONS

Tencent Technology, WO, PCT/CN2021/097567, Aug. 24, 2021, 5 pgs.
(Continued)

*Primary Examiner* — Daniel F Hajnik
*Assistant Examiner* — Jed-Justin Imperial
(74) *Attorney, Agent, or Firm* — Morgan, Lewis & Bockius LLP

(57) ABSTRACT

A method, an apparatus and a storage medium for constructing a three-dimensional (3D) facial mesh using artificial intelligence is disclosed. The method includes: obtaining a facial point cloud of a target object; determining, through an expansion calculation, pixel coordinates on a facial texture image of the target object that correspond to 3D data points in the facial point cloud, as index information of the 3D data points; performing triangulation on pixels on the facial texture image to obtain triangulation information; constructing an initial 3D facial mesh according to the triangulation information, the index information, and the facial point cloud; determining a non-core region in the initial 3D facial mesh; smoothing the non-core region in the initial 3D facial mesh; and replacing the non-core region in the initial 3D (Continued)

facial mesh with the smoothed non-core region to obtain a 3D facial mesh of the target object.

20 Claims, 19 Drawing Sheets

(51) Int. Cl.
    *G06T 7/64*     (2017.01)
    *G06T 7/70*     (2017.01)
    *G06T 15/04*     (2011.01)
    *G06V 40/16*     (2022.01)

(52) U.S. Cl.
    CPC ............ *G06T 15/04* (2013.01); *G06V 40/165* (2022.01); *G06T 2200/04* (2013.01); *G06T 2200/08* (2013.01); *G06T 2207/10028* (2013.01); *G06T 2207/20216* (2013.01); *G06T 2207/20221* (2013.01); *G06T 2207/30201* (2013.01); *G06T 2210/56* (2013.01)

(56) References Cited

U.S. PATENT DOCUMENTS

2019/0035149 A1*   1/2019   Chen .................... G06V 40/166
2020/0151940 A1*   5/2020   Yu ........................ G06V 40/168
2020/0372709 A1*  11/2020   Ponjou Tasse ............ G06T 7/55

FOREIGN PATENT DOCUMENTS

| | | | |
|---|---|---|---|
| CN | 107945267 | A | 4/2018 |
| CN | 107945278 | A | 4/2018 |
| CN | 107958489 | A | 4/2018 |
| CN | 109191552 | A | 1/2019 |
| CN | 110210374 | A | 9/2019 |
| CN | 110807836 | A | 2/2020 |
| CN | 111325823 | A | 6/2020 |
| CN | 111710036 | A | 9/2020 |
| EP | 3657440 | A1 | 5/2020 |

OTHER PUBLICATIONS

Tencent Technology, IPRP, PCT/CN2021/097567, Jan. 17, 2023, 6 pgs.

An-Bing Wang et al., "Mesh Simplification Based on Facial Features Region Partition", International Conference on Image Analysis and Signal Processing, IASP 2009, IEEE, Apr. 11, 2009, XP031468523, 4 pgs.

Mohamed Lamine Tazir et al., "Color-based 3D Point Cloud Reduction", 2016 14th International Conference on Control, Automation, Robotics and Vision (ICARCV), IEEE, Nov. 13, 2016, XP033054385, 7 pgs.

Tencent Technology, Extended European Search Report and Supplementary Search Report, EP21842458.8, Jun. 2, 2023, 17 pgs.

Tencent Technology, ISR, PCT/CN2021/097567, Aug. 24, 2021, 2 pgs.

* cited by examiner

METHOD AND APPARATUS FOR CONSTRUCTING THREE-DIMENSIONAL FACE MESH, DEVICE, AND STORAGE MEDIUM

CROSS-REFERENCE TO RELATED APPLICATIONS

This application is a continuation application of PCT Patent Application No. PCT/CN2021/097567, entitled "METHOD AND APPARATUS FOR CONSTRUCTING THREE-DIMENSIONAL FACIAL MODEL, AND DEVICE AND STORAGE MEDIUM" filed on Jun. 1, 2021, which claims priority to Chinese Patent Application No. 202010685183.0, filed with the China National Intellectual Property Administration on Jul. 16, 2020, and entitled "METHOD, APPARATUS, DEVICE AND STORAGE MEDIUM FOR CONSTRUCTING THREE-DIMENSIONAL FACIAL MESH", all of which are incorporated herein by reference in their entirety.

FIELD OF THE TECHNOLOGY

This application relates to the field of computer vision technologies of artificial intelligence (AI), and in particular, to construction technologies of a three-dimensional facial mesh.

BACKGROUND OF THE DISCLOSURE

Three-dimensional (3D) face reconstruction refers to reconstructing a 3D mesh of a human face from one or more two-dimensional (2D) face images.

In the related art, 3D face reconstruction is usually implemented in the following manner: obtaining one or more face images of a target object, obtaining points of various parts of a face from each face image, forming 3D point cloud data according to the points of the various parts of the face, and further performing Poisson reconstruction on the 3D point cloud data to obtain a 3D facial mesh of the target object.

However, the foregoing 3D face reconstruction method based on the Poisson reconstruction is time-consuming and inefficient.

SUMMARY

Embodiments of this application provide a method, an apparatus, a device, and a storage medium for constructing a 3D facial mesh, which improve the efficiency of 3D face reconstruction. The technical solutions are described as follows:

According to one aspect, an embodiment of this application provides a method for constructing a 3D facial mesh, the method including:
   obtaining a facial point cloud of a target object;
   determining, through the expansion calculation, pixel coordinates on a facial texture image of the target object that correspond to 3D data points in the facial point cloud as index information of the 3D data points;
   performing triangulation on pixels on the facial texture image to obtain triangulation information, the triangulation information being used for indicating triangular topologies corresponding to the pixels;
   constructing an initial 3D facial mesh according to the triangulation information, the index information and the facial point cloud;
   determining a non-core region in the initial 3D facial mesh, the non-core region being a non-facial region in the initial 3D facial mesh;
   smoothing the non-core region in the initial 3D facial mesh to obtain a smoothed non-core region; and
   replacing the non-core region in the initial 3D facial mesh with the smoothed non-core region to obtain a 3D facial mesh of the target object.

According to another aspect, an embodiment of this application provides an apparatus for constructing a 3D facial mesh, the apparatus including:
   a point cloud acquisition module, configured to obtain a facial point cloud of a target object;
   an index obtaining module, configured to determine, through the expansion calculation, pixel coordinates on a facial texture image of the target object that correspond to 3D data points in the facial point cloud as index information of the 3D data points;
   a triangulation module, configured to perform triangulation on pixels on the facial texture image to obtain triangulation information, the triangulation information being used for indicating triangular topologies corresponding to the pixels;
   an initial mesh construction module, configured to construct an initial 3D facial mesh according to the triangulation information, the index information and the facial point cloud;
   a region determining module, configured to determine a non-core region in the initial 3D facial mesh, the non-core region being a non-facial region in the initial 3D facial mesh;
   a region smoothing module, configured to smooth the non-core region in the initial 3D facial mesh to obtain a smoothed non-core region; and
   a region replacement module, configured to replace the non-core region in the initial 3D facial mesh with the smoothed non-core region to obtain a 3D facial mesh of the target object.

According to another aspect, an embodiment of this application provides a computing device, including a processor and a memory, the memory storing at least one instruction, at least one program, a code set, or an instruction set, the at least one instruction, the at least one program, the code set, or the instruction set being loaded and executed by the processor to implement the method described in the foregoing aspect.

According to yet another aspect, an embodiment of this application provides a computer-readable storage medium, storing at least one instruction, at least one program, a code set or an instruction set, the at least one instruction, the at least one program, the code set or the instruction set being loaded and executed by a processor to implement the method in the foregoing aspect.

According to still another aspect, an embodiment of this application provides a computer program product or a computer program, the computer program product or the computer program including computer instructions, the computer instructions being stored in a computer-readable storage medium. A processor of a computing device reads the computer instructions from the computer-readable storage medium and executes the computer instructions to cause the computing device to perform the method provided in the foregoing aspect.

The technical solutions provided in the embodiments of this application may bring the following beneficial effects:
   Triangulation information is obtained by performing triangulation on pixels on a facial texture image determined through the expansion calculation, and then a 3D facial mesh is obtained based on the triangulation information. In the embodiments of this application, a 3D facial mesh is constructed based on triangulation, which is fast and efficient.

In addition, after an initial 3D facial mesh is constructed, a non-core region in the initial 3D facial mesh is smoothed, so that the smoothed non-core region is used to replace the original non-core region to obtain a 3D facial mesh that achieves a better effect.

DESCRIPTION OF EMBODIMENTS

The solutions provided in embodiments of this application relate to the field of 3D face reconstruction technologies. A computer vision technology is used to analyze and process a face image of a target object to construct a 3D facial mesh of the target object, and a facial texture image of the target object can be generated. The 3D facial mesh is rendered through the facial texture image to generate a textured facial mesh.

Figure 1:
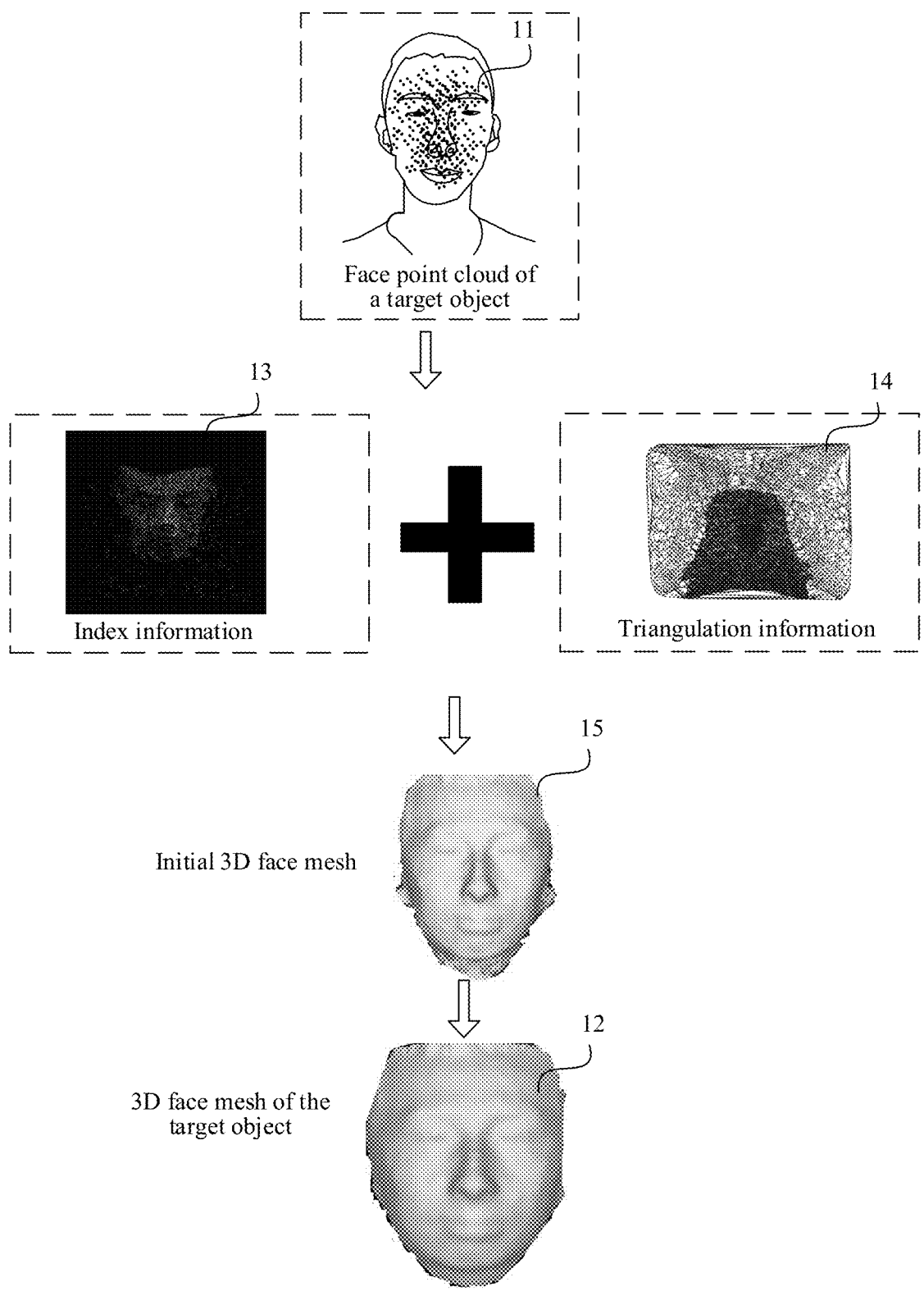
FIG. 1 is a frame diagram of a reconstruction process of a 3D facial mesh according to this application.

FIG. 1 is a frame diagram of a reconstruction process of a 3D facial mesh according to this application. It can be seen from the process that input data includes a facial point cloud 11 of a target object, and output data includes a 3D facial mesh 12 of the target object. After the facial point cloud 11 of the target object is obtained, in one aspect, pixel coordinates on a facial texture image 13 of the target object that correspond to 3D data points in the facial point cloud 11 are determined through the expansion calculation, as index information of the 3D data points. In another aspect, triangulation is performed on pixels on the facial texture image 13 to obtain triangulation information, the triangulation information being used for indicating triangular topologies 14 corresponding to the pixels. Then, an initial 3D facial mesh 15 is generated according to the index information and the triangulation information. After the initial 3D facial mesh 15 is obtained, a non-core region in the initial 3D facial mesh 15 needs to be smoothed to obtain a smoothed non-core region. Finally, the non-core region in the initial 3D facial mesh 15 is replaced with the smoothed non-core region to obtain a 3D facial mesh 12 of the target object.

In the method process provided in the embodiments of this application, an execution body of each step may be a terminal device such as a mobile phone, a tablet computer, a multimedia playback device, a wearable device, a personal computer (PC), or a server. For convenience of the description, in the following method embodiment, the execution body of each step being a computing device is taken as an example for description. The computing device may be any electronic device with computing and storage capabilities, such as the terminal or server described above.

The technical solution of this application is described in detail below with reference to several embodiments.

Figure 2:
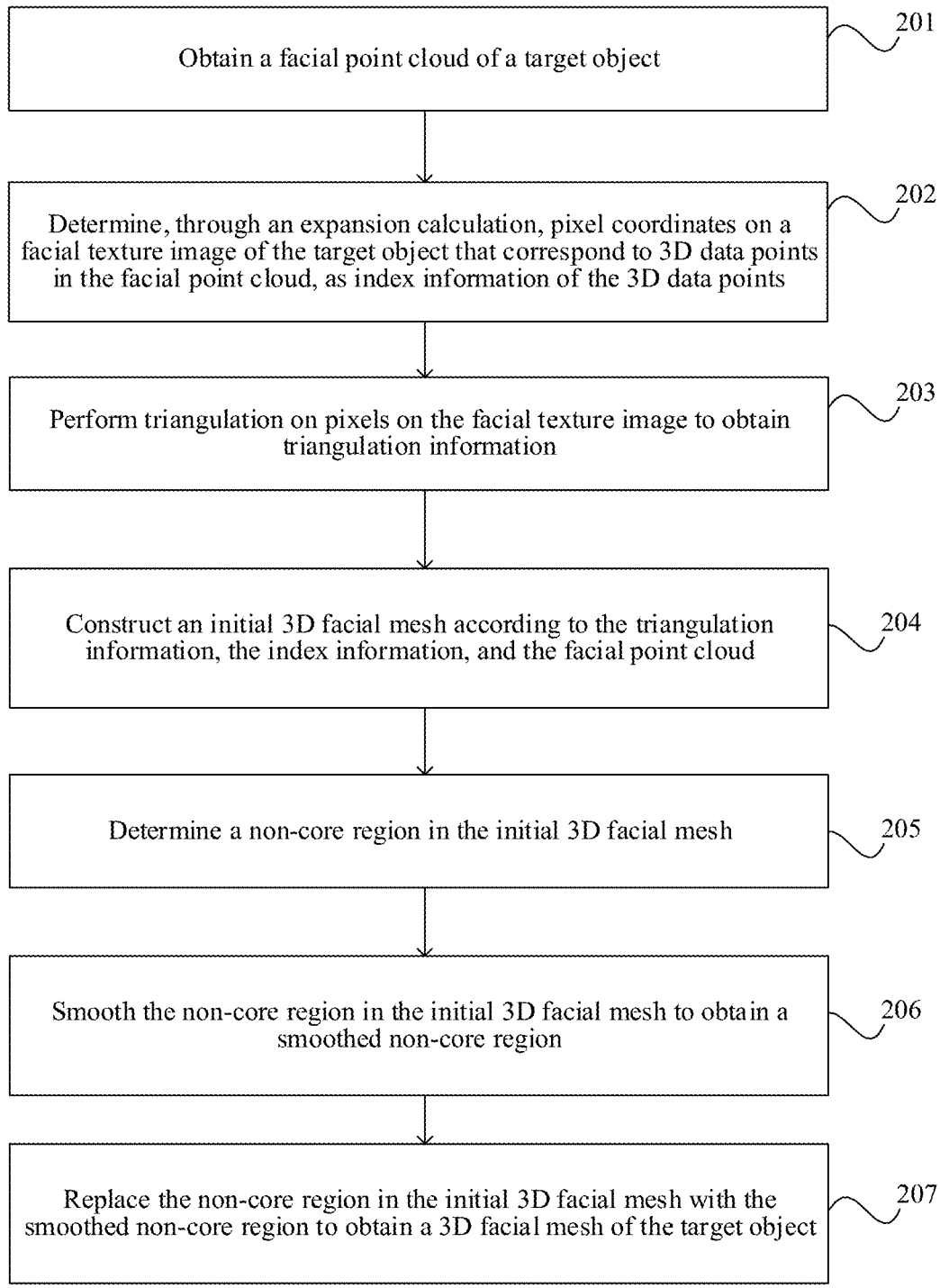
FIG. 2 is a flowchart of a method for constructing a 3D facial mesh according to an embodiment of this application.

FIG. 2 is a flowchart of a method for constructing a 3D facial mesh according to an embodiment of this application. The method may include the following steps.

Step 201. Obtain a facial point cloud of a target object.

The target object is any user who needs to construct a 3D facial mesh, and the target object may be any person. The target object may be a real person, or may also be a robot or other 3D characters occupying a specific spatial volume, which is not limited in this embodiment of this application.

A facial point cloud is a point cloud corresponding to a face, which is 3D data that describes the face of the target object by using a plurality of 3D data points. The facial point cloud includes a plurality of 3D data points. The 3D data points are points in a 3D space. Each 3D data point may be represented by 3D coordinates (x, y, z) in the 3D space.

In a possible implementation, a computing device collects at least one image pair of the target object, and each image pair includes a color image and a depth image; and then the facial point cloud of the target object is extracted according to the color image and the depth image. The x coordinate and y coordinate of each 3D data point in the facial point cloud may be determined from the color image, and the z coordinate of each 3D data point may be determined from the depth image.

Figure 3:
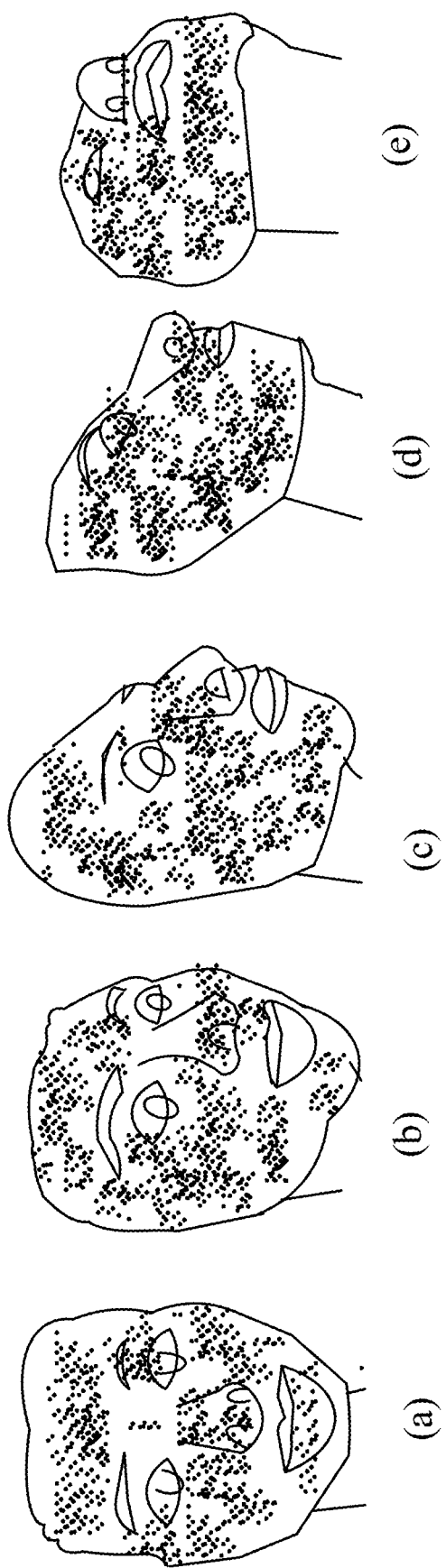
FIG. 3 shows schematic diagrams of a facial point cloud according to an embodiment of this application observed from different views.

FIG. 3 shows schematic diagrams of a facial point cloud observed from different views. Part (a) in FIG. 3 is a schematic diagram of a facial point cloud in a front face posture. Part (b) in FIG. 3 and part (c) in FIG. 3 are schematic diagrams of a facial point cloud in a right side face posture. Part (d) in FIG. 3 is a schematic diagram of a facial point cloud in a right side face head-up posture. Part (e) in FIG. 3 is a schematic diagram of a facial point cloud in a head-up posture.

Step 202. Determine, through the expansion calculation, pixel coordinates on a facial texture image of the target object that correspond to 3D data points in the facial point cloud, as index information of the 3D data points.

In some embodiments, the index information may also be called a uv index. The uv index of each 3D data point in the facial point cloud is pixel coordinates (u, v) on the facial texture image that correspond to the each 3D data point.

Step 203. Perform triangulation on pixels on the facial texture image to obtain triangulation information.

In an embodiment of this application, the triangulation information is used for indicating triangular topologies corresponding to the pixels. In the facial texture image of the target object, three adjacent pixels may be connected to form a triangular topology (or referred to a triangular patch).

In an embodiment of this application, the triangulation means to connect pixels in a given set of pixels by using triangles to form a mesh consisting of triangles. The essence is to reflect a topological relationship between each pixel and its neighboring pixels by using a mesh of triangles.

In a possible implementation, Delaunay triangulation is performed on pixels on the facial texture image to obtain the triangulation information.

Figure 4:
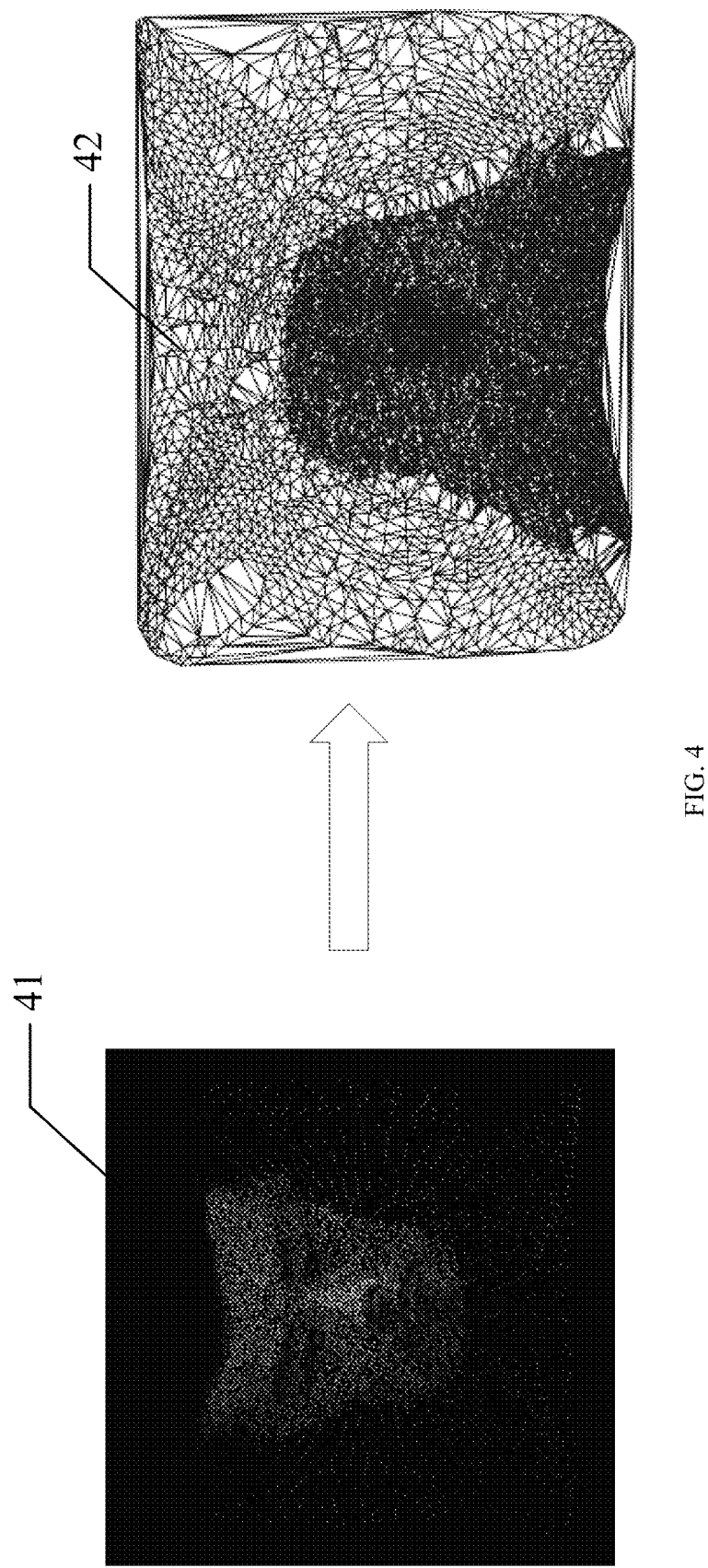
FIG. 4 is a schematic diagram of triangular topologies according to an embodiment of this application.

As shown in FIG. 4, the computing device performs triangulation on a facial texture image 41 on the left to obtain triangular topologies 42 on the right, and the triangulation information may be determined according to the triangular topologies 42.

Step 204. Construct an initial 3D facial mesh according to the triangulation information, the index information and the facial point cloud.

Figure 5:
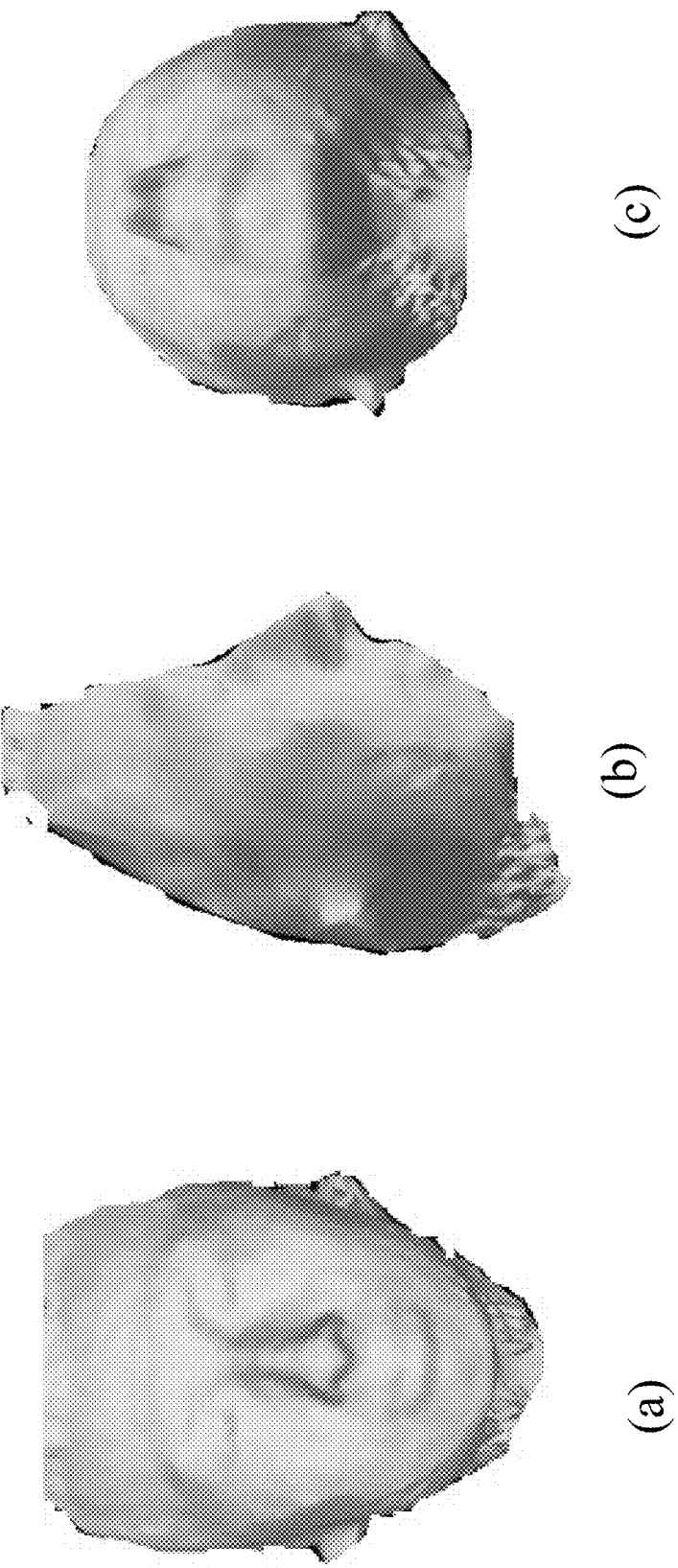
FIG. 5 is a schematic diagram of an initial 3D facial mesh according to an embodiment of this application.

Triangular topologies corresponding to all the pixels may be determined according to the triangulation information. The 3D data points in the facial point cloud that correspond to the pixels on the facial texture image may be determined according to the index information. Therefore, the triangular topologies corresponding to all the 3D data points in the facial point cloud may be obtained. The initial 3D facial mesh shown in FIG. 5 may be obtained based on the triangular topologies corresponding to all the 3D data points. Part (a) in FIG. 5 is an initial 3D facial mesh in a front face posture. Part (b) in FIG. 5 is an initial 3D facial mesh in a right side face posture. Part (c) in FIG. 5 is an initial 3D facial mesh in a head-up posture.

As shown in FIG. 5, a chin region in the initial 3D facial mesh is less effective due to the overlapping in the chin region. Therefore, it is necessary to adjust and optimize the chin region in the 3D facial mesh. The chin region is a non-core region.

Step 205. Determine a non-core region in the initial 3D facial mesh.

In an embodiment of this application, the non-core region is a non-facial region in the initial 3D facial mesh, that is, a region covering non-facial key 3D data points. The non-facial key 3D data points are 3D data points corresponding to non-facial key points. Facial key points may include key points on key parts of a face such as eyebrows, eyes, lips, or the like.

After determining the non-core region in the initial 3D facial mesh, the computing device may adjust and optimize the non-core region.

Step 206. Smooth the non-core region in the initial 3D facial mesh to obtain a smoothed non-core region.

In a possible implementation, the non-core region in the initial 3D facial mesh is transmitted to a Laplace mesh smoothing algorithm for smoothing to obtain a smoothed non-core region.

Step 207. Replace the non-core region in the initial 3D facial mesh with the smoothed non-core region to obtain a 3D facial mesh of the target object.

The 3D facial mesh of the target object is a 3D facial mesh of the target object reconstructed based on the facial point cloud. A 3D facial mesh may include a point cloud and triangular topologies.

Figure 6:
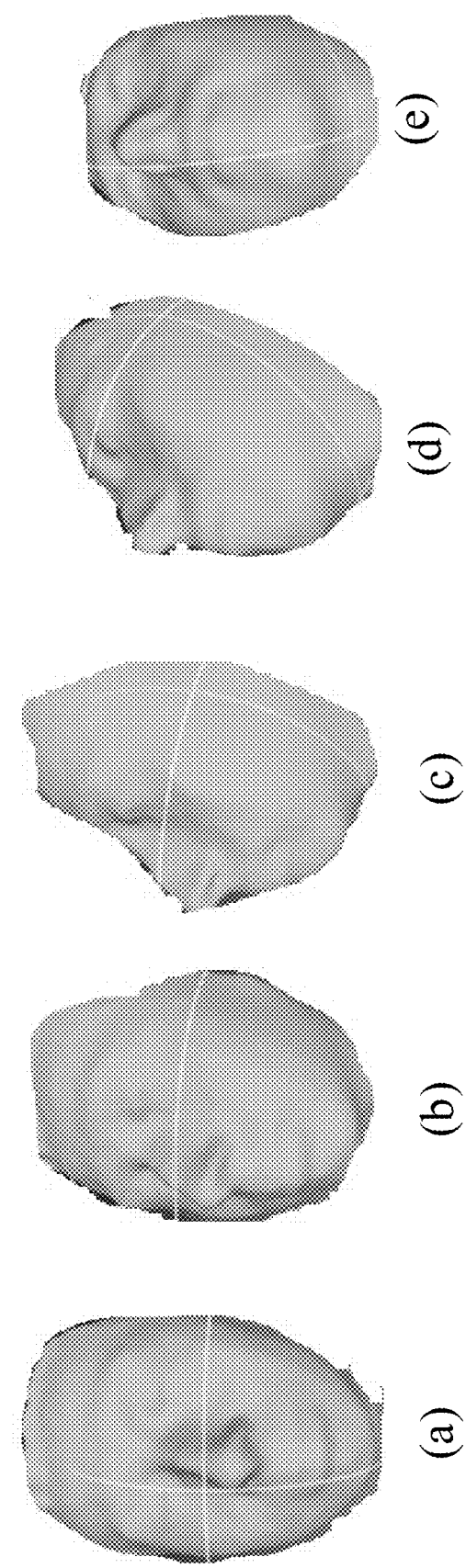
FIG. 6 is a schematic diagram of a 3D facial mesh according to an embodiment of this application.

FIG. 6 shows schematic diagrams of a 3D facial mesh of the target object generated after reconstruction of a facial point cloud, observed from different views. Part (a) in FIG. 6 is a schematic diagram of a 3D facial mesh in a front face posture. Part (b) in FIG. 6, part (c) in FIG. 6, and part (d) in FIG. 6 are schematic diagrams of a 3D facial mesh in a left side face posture. Part (e) in FIG. 6 is a schematic diagram of a 3D facial mesh in a head-up posture.

In summary, in the technical solution provided in the embodiments of this application, triangulation information is obtained by performing triangulation on pixels on a facial texture image determined through the expansion calculation, and then a 3D facial mesh is obtained based on the triangulation information. In this embodiment of this application, a 3D facial mesh is constructed based on triangulation, which is fast and efficient. In addition, after an initial 3D facial mesh is constructed, a non-core region in the initial 3D facial mesh is smoothed, so that the smoothed non-core region is used to replace the non-core region in the initial 3D facial mesh to obtain a 3D facial mesh of the target object, where the 3D facial mesh achieves a better effect.

Figure 7:
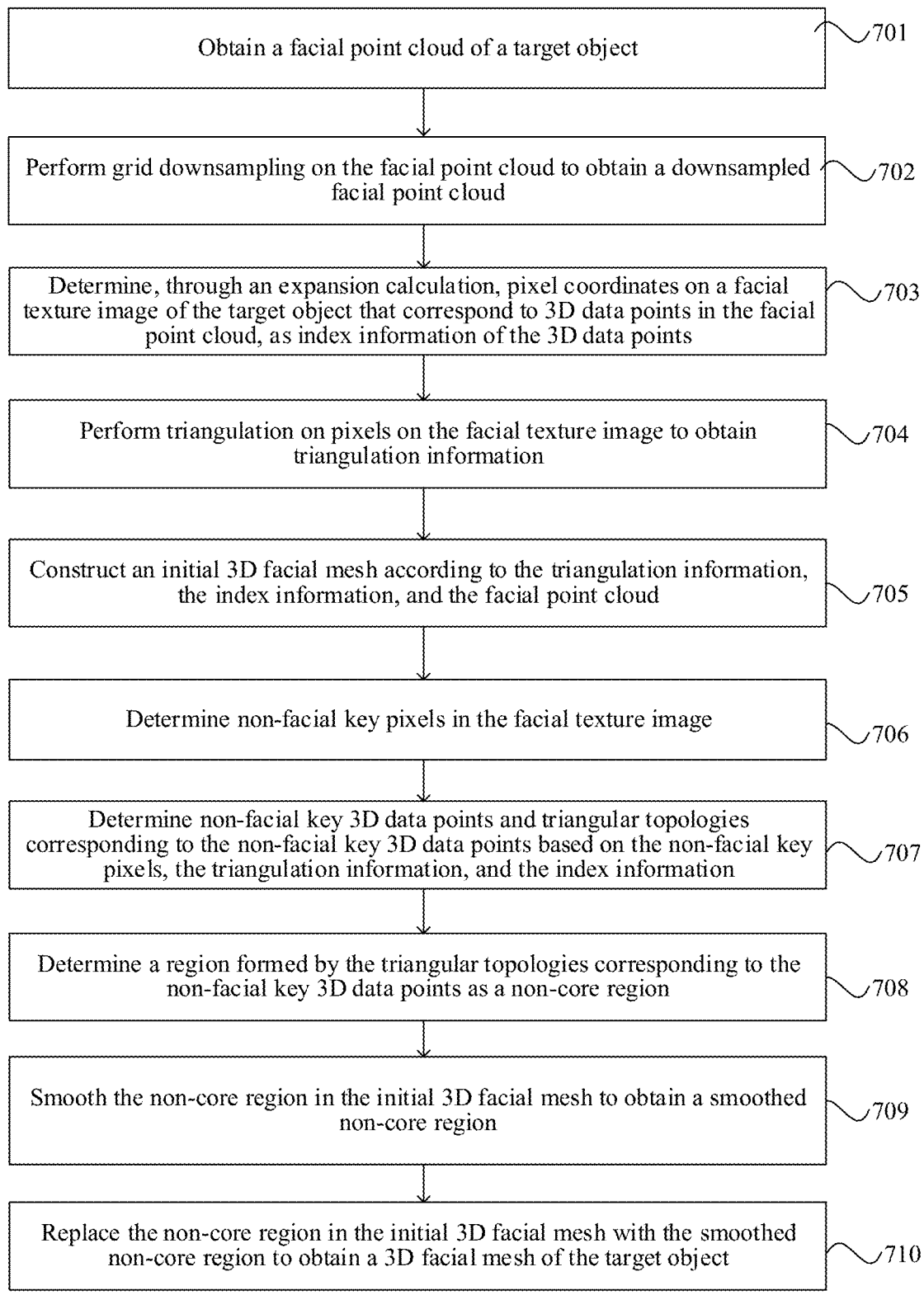
FIG. 7 is a flowchart of a method for constructing a 3D facial mesh according to another embodiment of this application.

FIG. 7 is a flowchart of a method for constructing a 3D facial mesh according to another embodiment of this application. The method may include the following steps.

Step 701: Obtain a facial point cloud of a target object.

For descriptions of step 701, reference may be made to the embodiments above, and details are not described herein again.

Step 702. Perform grid downsampling on the facial point cloud to obtain a downsampled facial point cloud.

In this embodiment of this application, grid densities corresponding to a neck region and a non-neck region in the downsampled facial point cloud are different. The neck region is a non-core region. Therefore, the neck region may be downsampled substantially, for example, the grid density corresponding to the neck region may be reduced to achieve substantial downsampling.

In a possible implementation, the step 702 includes the following substeps:

Step 702a. Define a plurality of grids corresponding to the neck region in a 3D space according to a first grid density, and define a plurality of grids corresponding to the non-neck region according to a second grid density.

In a possible implementation, the first grid density is lower than the second grid density, so that the neck region is downsampled substantially.

Step 702b. Fuse the facial point cloud into a plurality of grids in the 3D space.

Step 702c. Average, under a same coordinate dimension, 3D coordinates of the 3D data points in the facial point cloud that are included in each grid to obtain the downsampled facial point cloud.

For example, one grid includes three 3D data points: a 3D data point 1, a 3D data point 2, and a 3D data point 3. 3D coordinates of the 3D data point 1 are (x1, y1, z1), 3D coordinates of the 3D data point 2 are (x2, y2, z2), and 3D coordinates of the 3D data point 3 are (x3, y3, z3). The grid includes one 3D data point after being downsampled, and 3D coordinates of the 3D data point are ((x1+x2+x3)/3, (y1+y2+y3)/3, (z1+z2+z3)/3). A downsampling manner of each grid in the 3D space is similar to the method described above, and is not repeated herein.

By downsampling the facial point cloud, the facial point cloud is more evenly distributed. In addition, the grid downsampling is first performed on the facial point cloud, and then a subsequent process is performed based on the downsampled facial point cloud, which can reduce the processing overheads of the computing device.

Step 703. Determine, through the expansion calculation, pixel coordinates on a facial texture image of the target object that correspond to 3D data points in the downsampled facial point cloud as index information of the 3D data points.

In a possible implementation, step 703 includes the following substeps. The facial point cloud in the following steps may be the downsampled facial point cloud, or the facial point cloud without being downsampled; if the facial point cloud is downsampled through step 702, the facial point cloud in the subsequent steps is the downsampled facial point cloud. On the contrary, if step 702 is not performed and the facial point cloud is not downsampled, the facial point cloud in the subsequent steps is the facial point cloud without being downsampled.

Step 703a. Obtain 3D coordinates in a 3D coordinate system that correspond to the 3D data points in the facial point cloud.

In a constructed 3D coordinate system, 3D coordinates of a 3D data point in the facial point cloud may be obtained in the 3D coordinate system, where the 3D coordinates may be (x, y, z).

Figure 8:
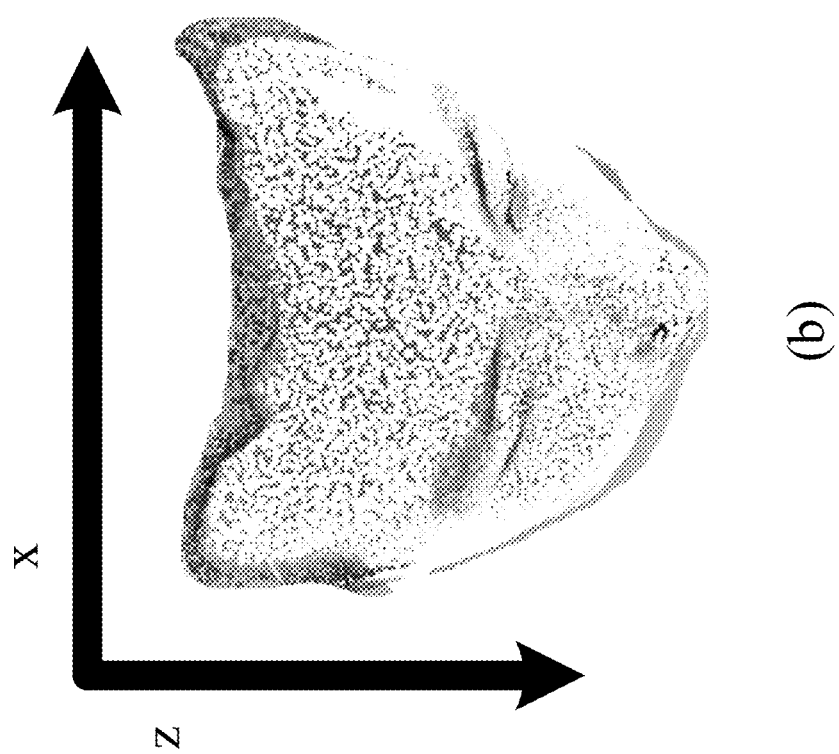
FIG. 8 is a schematic diagram of a facial point cloud in a 3D coordinate system according to an embodiment of this application.
Figure 8:
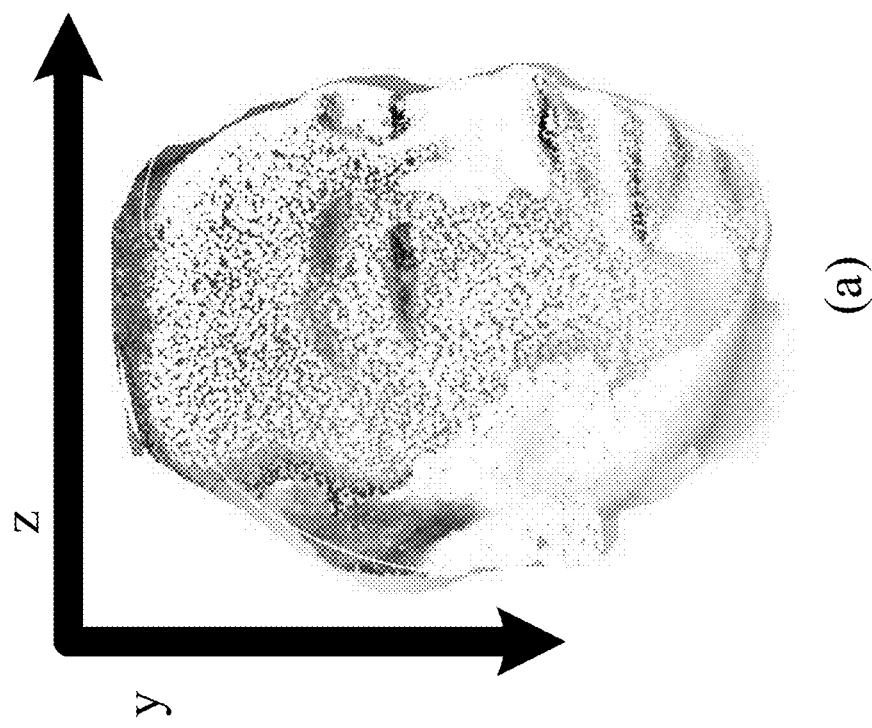

In some embodiments, before the 3D coordinates are obtained, the 3D coordinate system is first constructed. The 3D coordinate system may include an x-axis, a y-axis, and a z-axis, which are perpendicular to each other. In some embodiments, the x-axis is a coordinate axis in a horizontal direction, for example, a direction from the left eye to the right eye; the y-axis is a coordinate axis in a vertical direction, for example, a direction from the center of the eyebrows to the mouth; and the z-axis is a coordinate axis in a depth direction, for example, a direction from the back of the head to the tip of the nose. As shown in FIG. 8, part (a) in FIG. 8 is a schematic diagram of a facial point cloud observed from left to right. The z-axis direction and the y-axis direction may be clearly seen from part (a) in FIG. 8; and part (b) in FIG. 8 is a schematic diagram of the facial point cloud observed from the top of the head downwards. The x-axis direction and the z-axis direction may be clearly viewed from the top view perspective.

Step 703b. Determine, according to the 3D coordinates of the 3D data points through cylindrical expansion calculation, the pixel coordinates on the facial texture image that correspond to the 3D data points, as the index information.

In an embodiment of this application, the facial point cloud may be regarded as a cylinder, and a direction from the top to the bottom of the cylinder is a direction from the top of the head downwards. Through cylindrical expansion, pixel coordinates (u, v) on the facial texture image that correspond to each 3D data point (x, y, z) may be calculated. In some embodiments, the calculation formula may be as follows:

$$v=(y-y_{min})/(y_{max}-y_{min});\text{ and}$$

$$u=a\tan(z/x),$$

where v represents an unfolded ordinate, u represents an unfolded abscissa, $y_{max}$ and $y_{min}$ respectively represent a maximum value and a minimum value of the 3D data points included in the facial point cloud on the y-axis, and the a tan( ) function represents an arctangent function.

U is processed in different quadrants, so as to implement a correspondence with positions in the facial point cloud.

Figure 9:
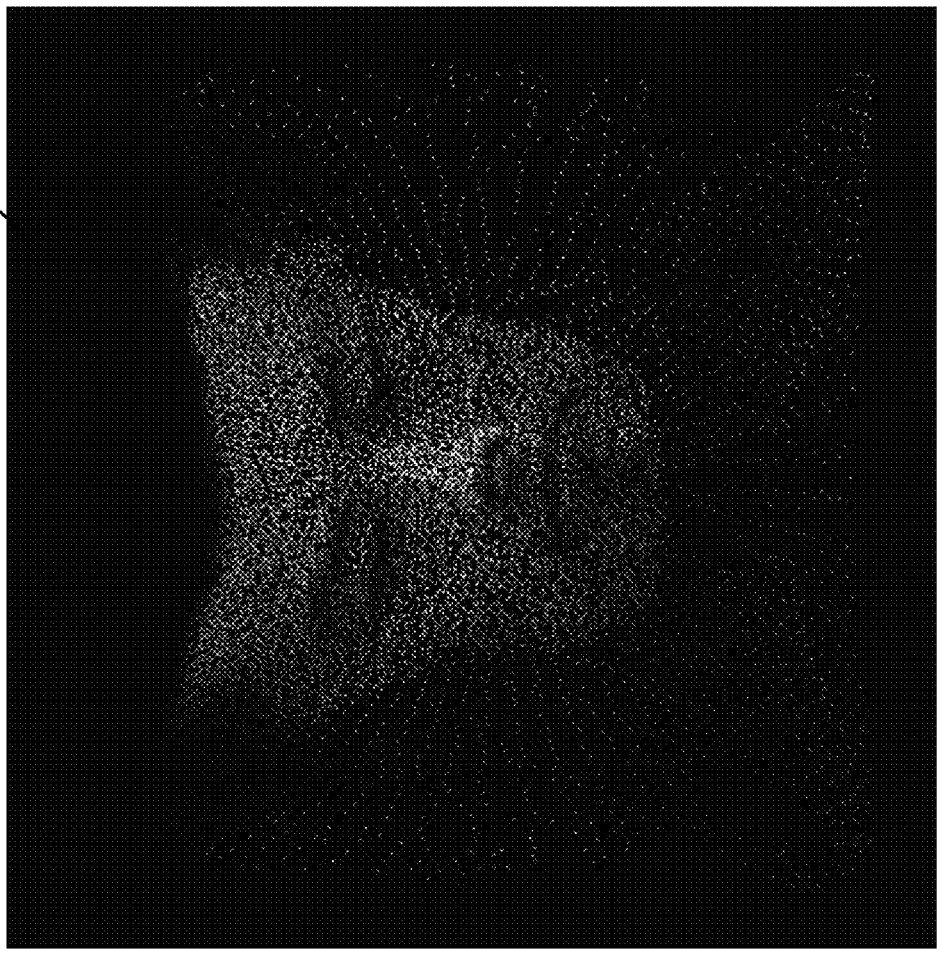
FIG. 9 is a schematic diagram of pixels on a facial texture image according to an embodiment of this application.

Through the foregoing formula, a planar 2D uv index may be obtained from the facial point cloud through cylindrical expansion. FIG. 9 is a schematic diagram of pixels on a facial texture image 91 according to an embodiment of this application.

In a possible implementation, in addition to the cylindrical expansion calculation, the pixel coordinates may also be determined through spherical expansion calculation; in this case, v=a tan(z/y), and u=a tan(z/x); alternatively, the pixel coordinates may further be determined through stereo expansion calculation; in this case, $u=(x-x_{min})/(x_{max}-x_{min})$, and $v=(y-y_{min})/(y_{max}-y_{min})$. This application does not make any limitation on the calculation method used for the expansion calculation.

Step 704. Perform triangulation on pixels on the facial texture image to obtain triangulation information.

In an embodiment of this application, the triangulation information is used for indicating triangular topologies corresponding to the pixels.

Step 705. Construct an initial 3D facial mesh according to the triangulation information, the index information and the facial point cloud.

Step 706. Determine non-facial key pixels in the facial texture image.

In a possible implementation, step 706 includes the following substeps:

Step 706a. Determine a convex hull corresponding to a core region in the facial texture image.

In an embodiment of this application, the core region is a region covered by facial key pixels in the facial texture image. The facial key pixels are pixels corresponding to facial key points, and the convex hull is a region that exactly covers the facial key pixels.

Step 706b. Enlarge the convex hull based on a dilation threshold, to obtain a target region.

Figure 10:
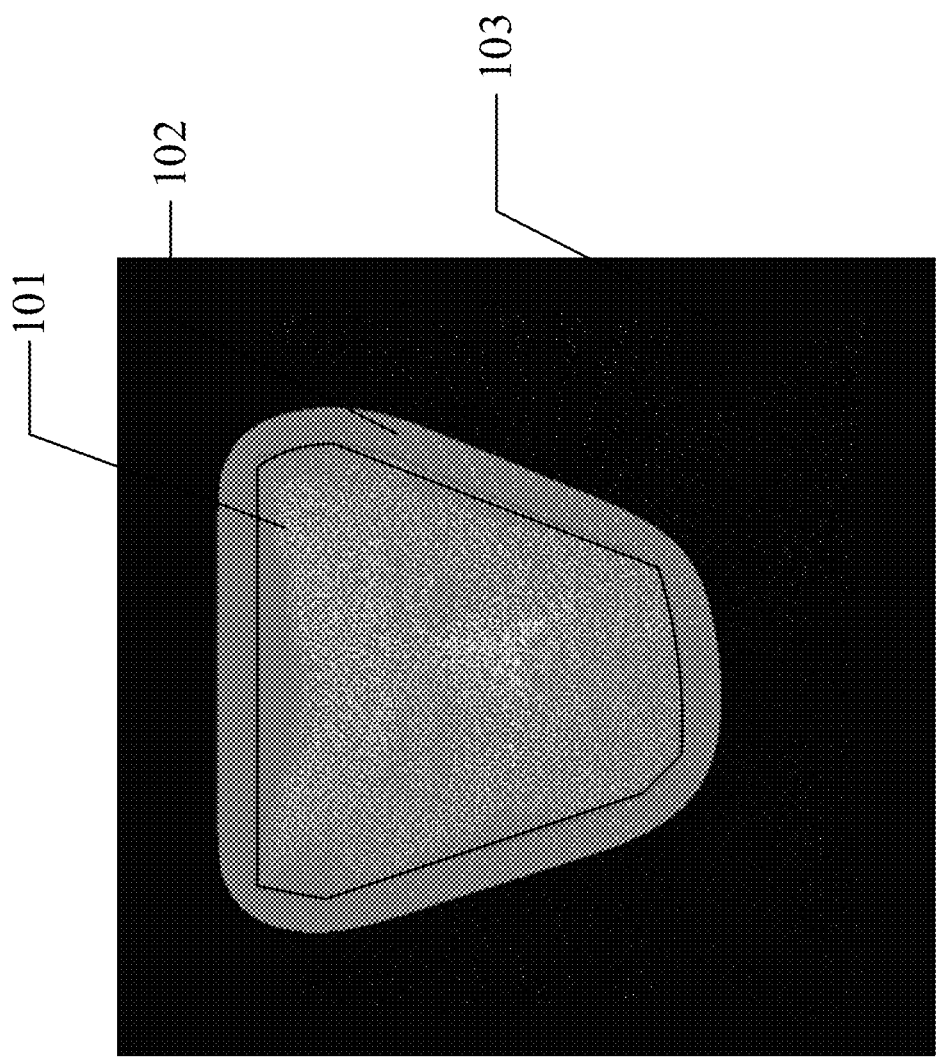
FIG. 10 is a schematic diagram of a target region according to an embodiment of this application.
Figure 11:
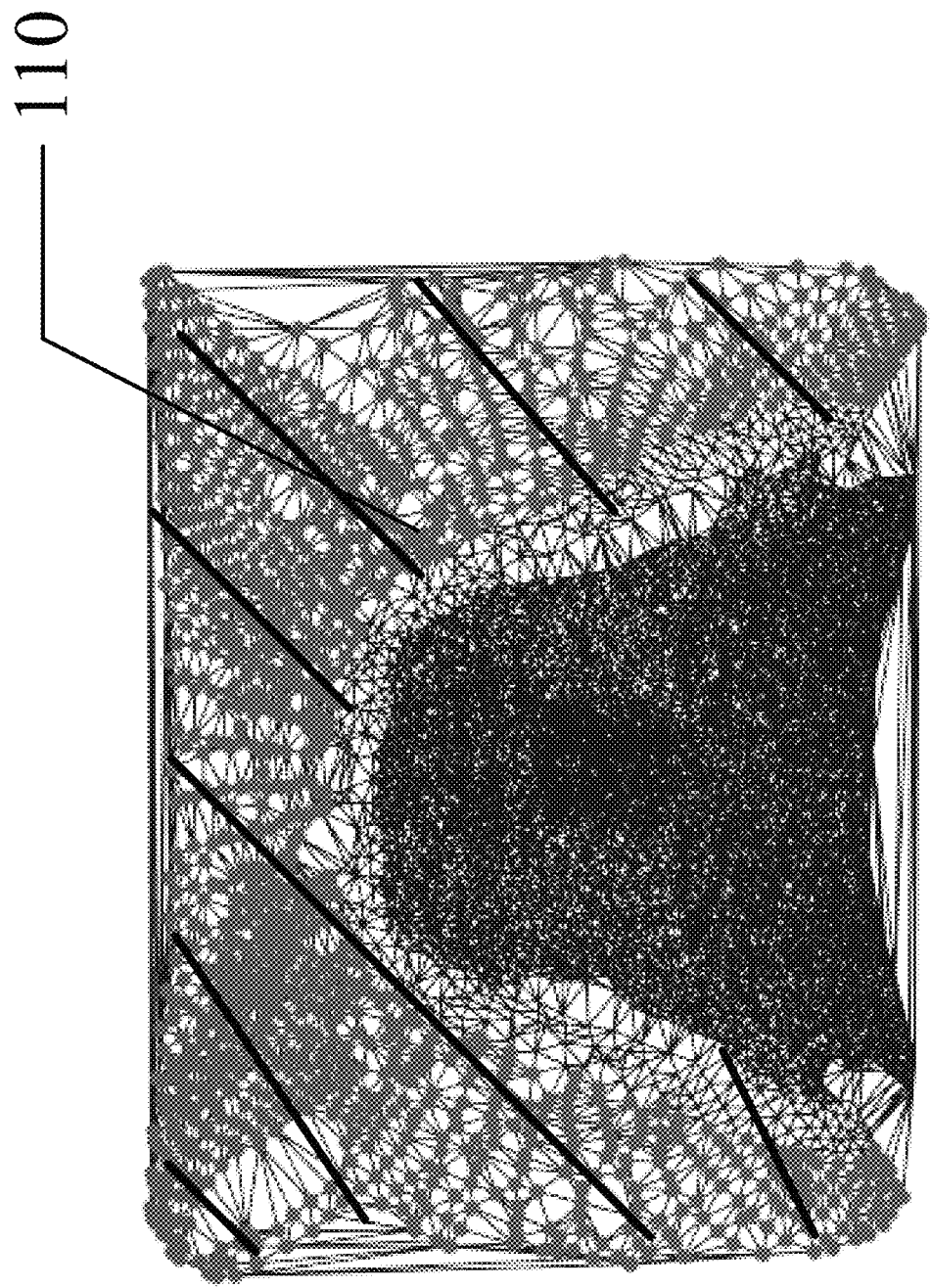
FIG. 11 is a schematic diagram of triangular topologies according to another embodiment of this application.

In some embodiments, the dilation threshold is specified based on a resolution. FIG. 10 is a schematic diagram of a target region according to an embodiment of this application. A convex hull 101 is enlarged based on the dilation threshold to obtain a target region 102.

Step 706c. Determine pixels in a region other than the target region in the facial texture image as the non-facial key pixels.

Pixels included in a region other than the target region may be regarded as neck points far away from the face, and the neck points far away from the face are non-facial key pixels. Pixels included in a region 103 in FIG. 10 may be regarded as non-facial key pixels.

After the convex hull is enlarged, the target region is obtained. The non-facial key pixels are determined based on the target region, so that the subsequent smoothing processing is more accurate, and a smoothed non-core region is fused with the initial 3D facial mesh more naturally.

Step 707. Determine non-facial key 3D data points and triangular topologies corresponding to the non-facial key 3D data points based on the non-facial key pixels, the triangulation information and the index information.

The triangular topologies corresponding to the non-facial key pixels may be determined based on the non-facial key pixels and the triangulation information. As shown in FIG.

11, a region 110 with oblique lines is the triangular topologies corresponding to the non-facial key pixels.

The index information reflects a correspondence between the pixels on the facial texture image and the 3D data points in the facial point cloud. Therefore, the non-facial key 3D data points may be determined based on the non-facial key pixels and the index information. The triangular topologies corresponding to the non-facial key 3D data points may be determined based on the non-facial key 3D data points and the triangulation information.

Step 708. Determine a region formed by the triangular topologies corresponding to the non-facial key 3D data points as a non-core region.

Figure 12:
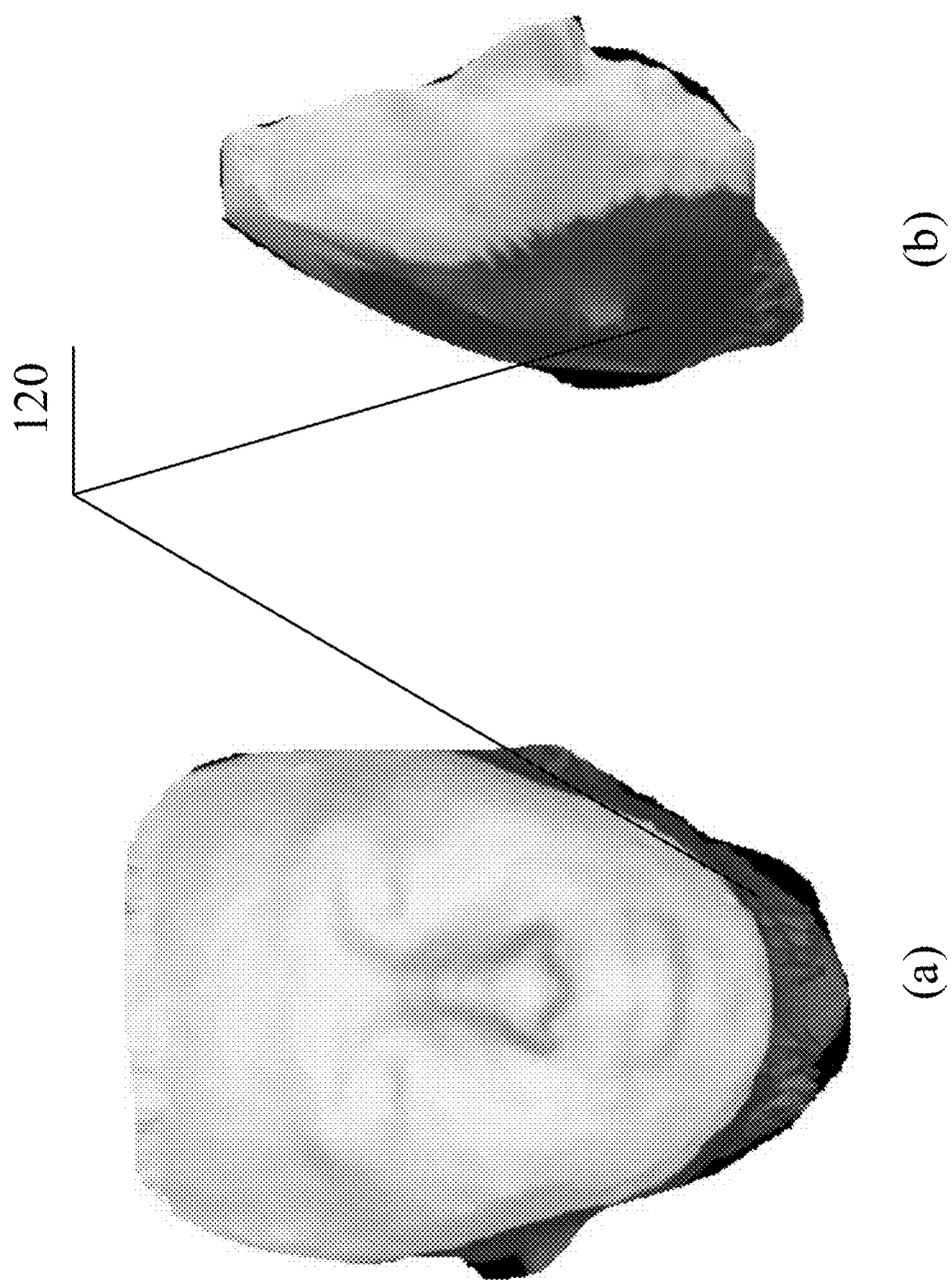
FIG. 12 is a schematic diagram of a non-core region according to an embodiment of this application.

As shown in FIG. 12, a dark region 120 in FIG. 12 represents a non-core region. Part (a) in FIG. 12 is a schematic diagram of a non-core region in a front face posture. Part (b) in FIG. 12 is a schematic diagram of a non-core region in a side face posture.

Step 709. Smooth the non-core region in the initial 3D facial mesh to obtain a smoothed non-core region.

Step 710. Replace the non-core region in the initial 3D facial mesh with the smoothed non-core region to obtain a 3D facial mesh of the target object.

Figure 13:
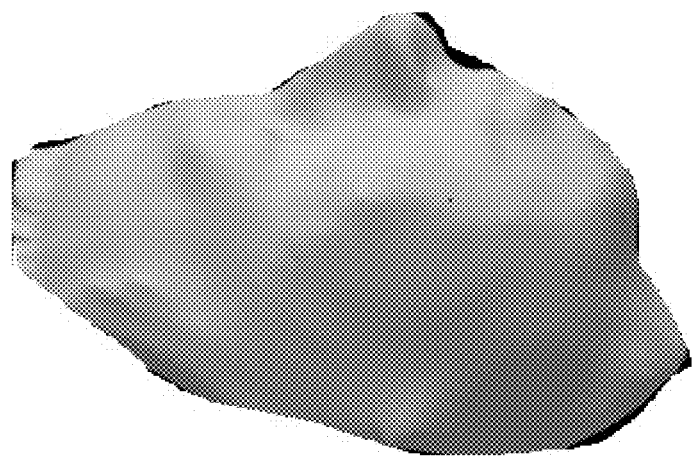
FIG. 13 is a schematic diagram of a 3D facial mesh according to another embodiment of this application.
Figure 13:
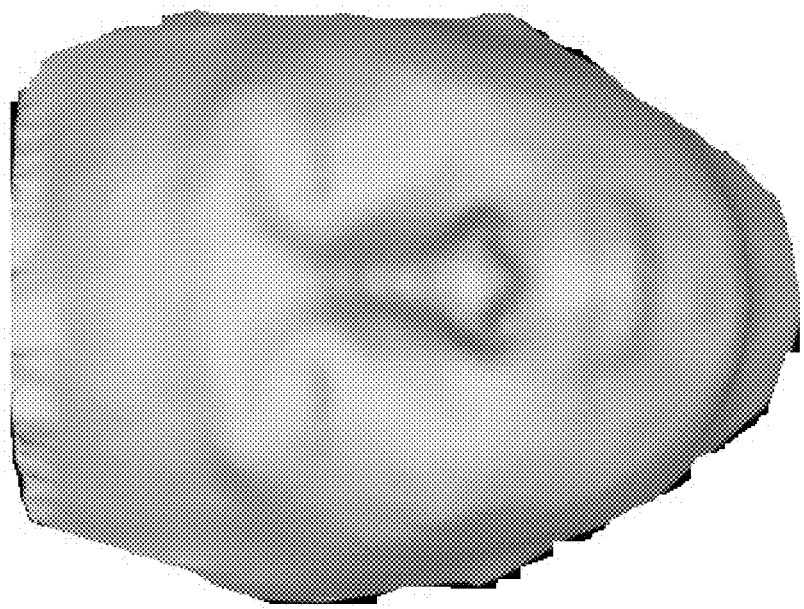

The non-core region in the initial 3D facial mesh is replaced with the smoothed non-core region to eliminate the overlapping of the chin region, and finally a schematic diagram of the 3D facial mesh shown in FIG. 13 is obtained. Part (a) in FIG. 13 is a schematic diagram of a 3D facial mesh in a front face posture. Part (b) in FIG. 13 is a schematic diagram of a 3D facial mesh in a right side face posture.

Figure 14:
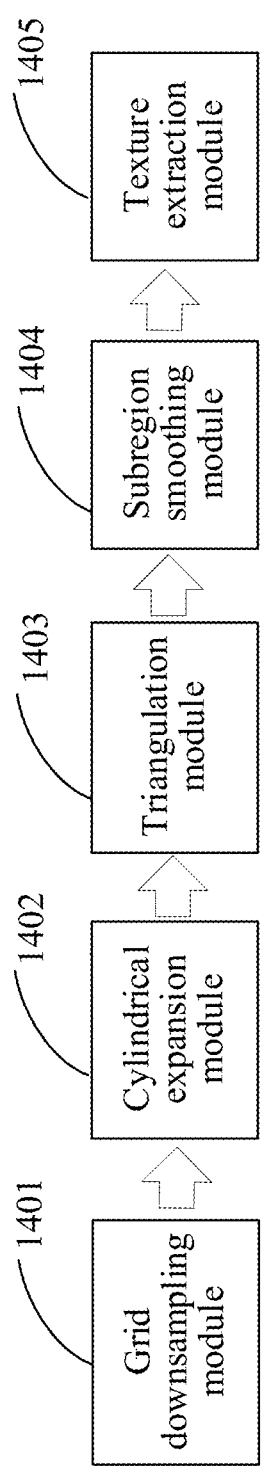
FIG. 14 is a block diagram of a construction process of a 3D facial mesh according to an embodiment of this application.

FIG. 14 is a block diagram of a construction process of a 3D facial mesh according to an embodiment of this application. The block diagram of the construction process of the 3D facial mesh includes a grid downsampling module 1401, a cylindrical expansion module 1402, a triangulation module 1403, and a subregion smoothing module 1404. The grid downsampling module 1401 is configured to perform grid downsampling on a facial point cloud to obtain a downsampled facial point cloud. The cylindrical expansion module 1402 is configured to perform cylindrical expansion calculation on the downsampled facial point cloud to determine index information. The triangulation module 1403 is configured to perform triangulation on pixels on a facial texture image to obtain triangulation information, so as to construct an initial 3D facial mesh based on the triangulation information, the index information and the facial point cloud. The subregion smoothing module 1404 is configured to smooth a non-core region in the initial 3D facial mesh to obtain a 3D facial mesh of the target object.

In a possible implementation, the block diagram of the construction process of the 3D facial mesh further includes a texture extraction module 1405. The texture extraction module 1405 is configured to generate a facial texture image of the target object. For a specific process of generating the facial texture image of the target object, reference may be made to the following embodiments, which is not repeated herein.

In summary, in the technical solution provided in the embodiments of this application, by performing grid downsampling on the facial point cloud, the facial point cloud may be more evenly distributed, and a specific smoothing effect can be achieved. In addition, the facial point cloud first downsampled, so that the processing overheads of the computing device can be reduced when the computing device subsequently processes the downsampled facial point cloud.

In a schematic embodiment, the facial texture image of the target object is generated in the following manner in this embodiment of this application:

First, n face images corresponding to n head postures of the target object are obtained, n being a positive integer.

The face image of the target object is an RGB image (or referred to a color image) including a face of the target object, and the RGB image may be obtained by photographing the target object with a camera. Each pixel value of the RGB image is represented by color components of three channels: red (R), green (G), and blue (B). In some embodiments, when RGB images of the target object are captured, depth images corresponding to all the RGB images may also be obtained. The depth image is an image in which distance values from the camera to all points in a scene where the target object is located are used as pixel values. The depth image is also referred to a distance image. The depth image reflects a geometrical shape of a visible surface of an object. The depth image is similar to a grayscale image, except that all pixel values of the depth image are actual distances from the camera to the object. The RGB image and the depth image of the target object may be registered, and the pixels thereof are in a one-to-one correspondence.

The RGB image and the depth image of the target object may be two images captured by a 3D camera. Compared with an ordinary 2D camera only capable of capturing RGB images, the 3D camera can capture depth images in addition to the RGB images. The 3D camera may include a color camera for capturing RGB images, and a depth sensor for collecting depth information to generate depth images.

The n face images may be face images of the target object in n head postures.

In an example, a value of n is 1. For example, a face image of the target object in a front face posture is obtained.

In another example, to improve the accuracy of 3D face reconstruction, the value of n is greater than 1. For example, the n head postures include a front face posture, a right side face posture, a left side face posture, and a head-up posture.

Figure 15:
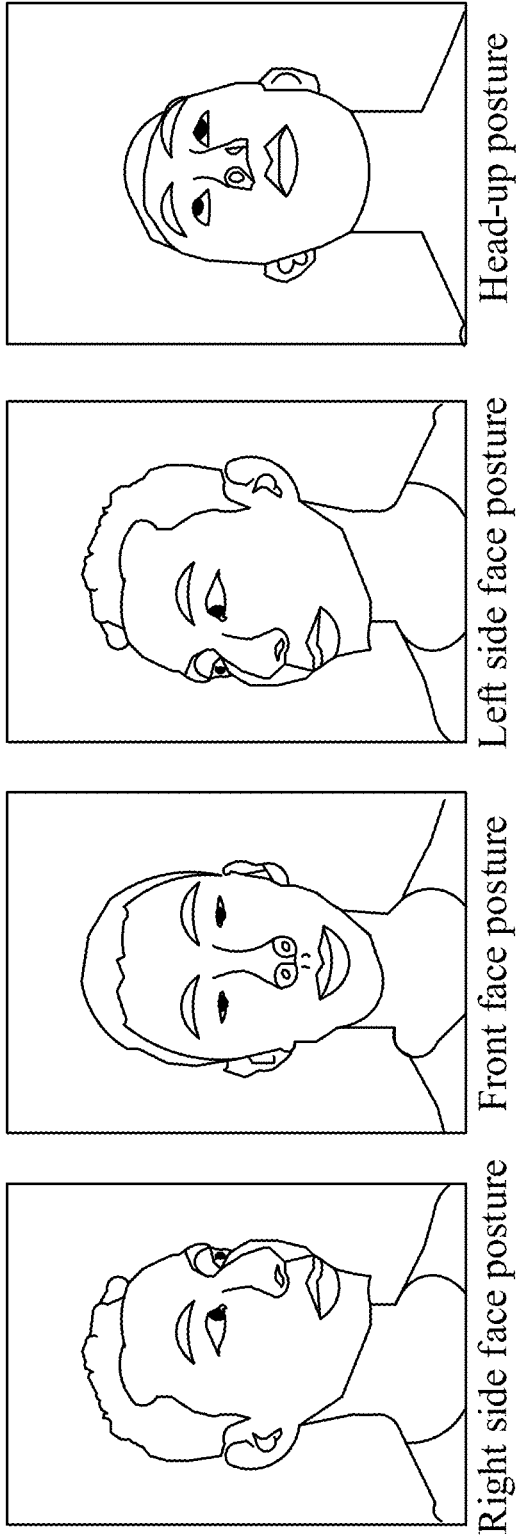
FIG. 15 is a schematic diagram of a face image according to an embodiment of this application.

Head postures, corresponding to which face images of the target object are obtained by the computing device, may be set in advance. For example, as shown in FIG. 15, face images of the target object in the following four head postures are obtained: a right side face posture, a front face posture, a left side face posture, and a head-up posture.

In some embodiments, after a position of the camera for capturing face images of the target object is fixed, the target object turns the head, and the camera captures a plurality of face images of the target object. For example, images during the whole head turning process of the target object are captured and stored by the camera. For the sake of efficiency, it is unnecessary to perform calculation on all the captured images, because a lot of data are repeated. Hundreds of face images are captured in the whole head turning process of the target object, and if all the face images are involved in calculation, it causes a waste of calculation resources. Therefore, only several representative face images need to be selected from the hundreds of face images for subsequent calculation.

In a possible implementation, a plurality of candidate face images of the target object are obtained; qualified target images are screened out from the plurality of candidate face images; and face images in n head postures are selected from the target images. Unqualified face images (such as blinking, motion blur, etc.) are removed, and the qualified target images are retained. Then, n face images are selected from the qualified target images according to the head postures.

Second, a mapping relationship between the 3D data points and pixels on the face image is obtained.

When there are n face images, the mapping relationship between the 3D data points in the facial point cloud and pixels on each face image needs to be separately obtained, that is, n mapping relationships are obtained.

In some embodiments, the mapping relationship is obtained as follows: for an $i^{th}$ face image in the n face images, the 3D data points are projected onto the $i^{th}$ face image by perspective projection to obtain pixel coordinates on the $i^{th}$ face image that correspond to the 3D data points as the $i^{th}$ mapping relationship. There are n mapping relationships, and the $i^{th}$ mapping relationship in the n mapping relationships corresponds to the $i^{th}$ face image, and i is a positive integer less than or equal to n.

Because the head posture corresponding to each face image is known, the facial point cloud may be rotated and translated according to the head posture, and then projected onto the face image corresponding to the head posture according to camera parameters.

Third, image regions corresponding to the head postures are respectively obtained from the n face images to obtain n valid regions.

When the quantity n of face images is greater than 1, n mapping relationships are generated, and one facial texture image of the target object can be generated from each mapping relationship in combination with the index information. Therefore, it is necessary to perform multi-perspective fusion on the plurality of facial texture images to finally generate a fused facial texture image.

In some embodiments, the step includes the following substeps:

1. For the $i^{th}$ face image in the n face images, facial key points are detected from the $i^{th}$ face image.

Facial key points include key points on key parts of a face, such as eyebrows, eyes, a lip, a face contour, or the like.

2. A valid region in the $i^{th}$ face image is obtained according to positions of the facial key points and a predefined rule.

The valid region in the $i^{th}$ face image is a region determined according to the head posture corresponding to the $i^{th}$ face image and used for fusion to generate a final facial texture image.

For example, in determining of the valid region in the $i^{th}$ face image, after the facial key points are detected from the $i^{th}$ face image, a circle is drawn with the tip of the nose as the center, and the size of the circle is determined by a facial key point with the longest distance from the tip of the nose among all the facial key points, that is, the circle is the smallest circle including all the detected facial key points with the tip of the nose as the center. Then, from the circular region, a region including a completely visible face part in the current head posture is selected as a valid region. For example, if the $i^{th}$ face image is a face image in a front face posture, a region in the circle may be directly determined as a valid region. If the $i^{th}$ face image is a face image in a left side face posture, a line passing through three key points, namely, the left corner of the left eye, the left corner of the mouth, and the center of the chin, is generated, and a region that is enclosed by the line and the circle and includes the left side face is used as the valid region. If the $i^{th}$ face image is a face image in a right side face posture, a line passing through three key points, namely, the right corner of the right eye, the right corner of the mouth, and the center of the chin, is generated, and a region that is enclosed by the line and the circle and includes the right side face is used as the valid region. If the $i^{th}$ face image is a face image in a head-up posture, a region including the chin part enclosed by the left corner of the mouth, the right corner of the mouth, contour points of the left cheek, contour points of the right cheek and the circle is used as the valid region.

Fourth, for an $i^{th}$ valid region in the n valid regions, target 3D data points corresponding to pixels in the $i^{th}$ valid region are obtained according to the mapping relationship, i being a positive integer less than or equal to n.

Fifth, target pixels, which are on a regional texture image corresponding to the $i^{th}$ valid region, corresponding to the target 3D data points are obtained according to the index information.

Sixth, the target pixels are rendered to generate the regional texture image corresponding to the $i^{th}$ valid region, pixel values of the target pixels being determined according to pixel values of the pixels in the $i^{th}$ valid region.

Figure 16:
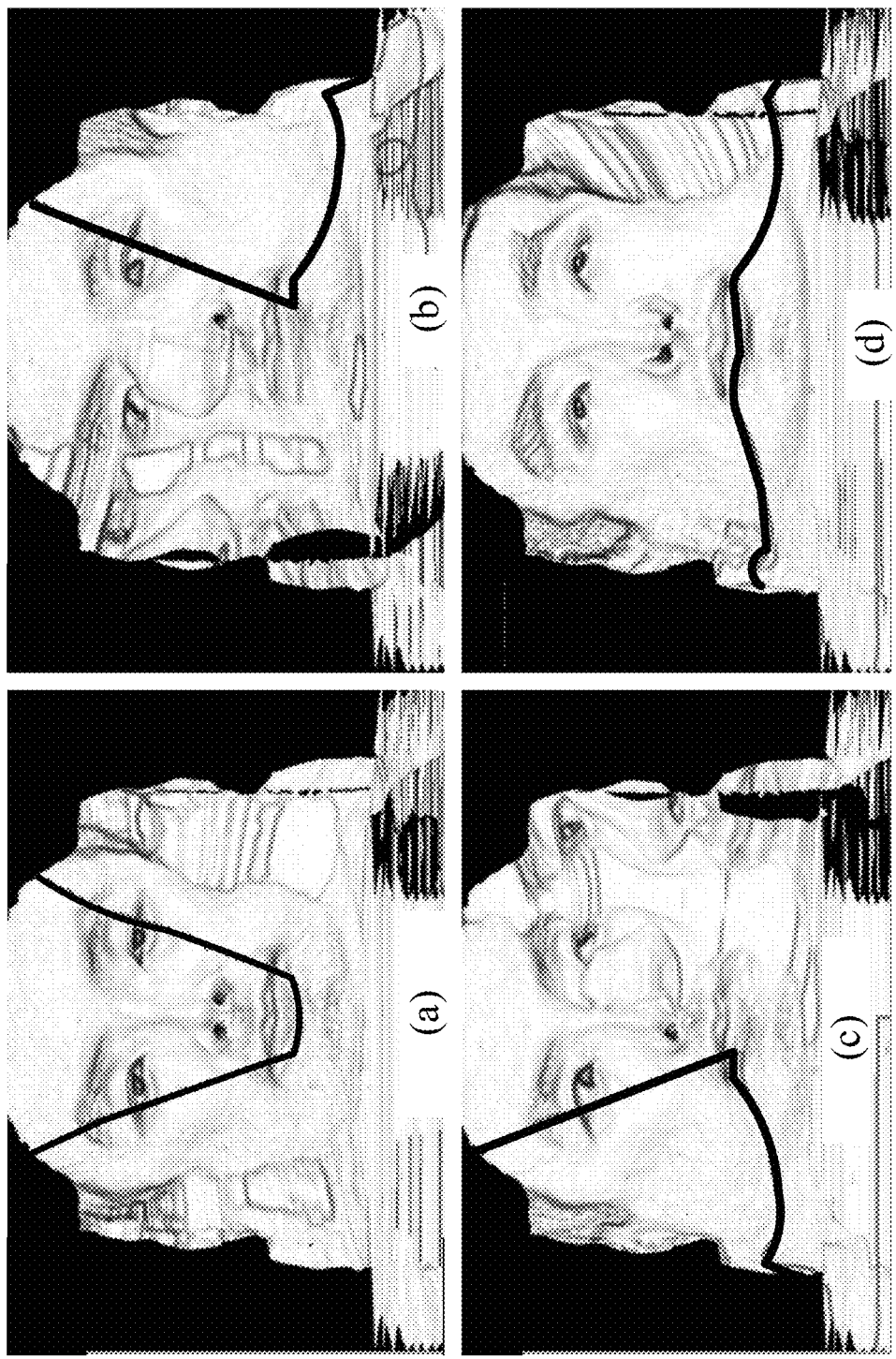
FIG. 16 is a schematic diagram of a regional texture image according to an embodiment of this application.

As shown in FIG. 16, part (a) in FIG. 16 is a regional texture image corresponding to a valid region in a face image of a front face posture. Part (b) in FIG. 16 is a regional texture image corresponding to a valid region in a face image of a left side face posture. Part (c) in FIG. 16 is a regional texture image corresponding to a valid region in a face image of a right side face posture. Part (d) in FIG. 16 is a regional texture image corresponding to a valid region in a face image of a head-up posture.

Seventh, image fusion is performed on the n regional texture images to generate the facial texture image of the target object.

After the regional texture images corresponding to n valid regions are generated, a complete face is formed by splicing the n valid regions. Therefore, the n regional texture images may be spliced to generate a facial texture image of the target object.

Because lighting conditions under different head postures may be different, colors of the face images are different in certain degree, for example, the front face is obviously white. In this case, if the n regional texture images are directly spliced to generate the facial texture image of the target object, an obvious dividing line appears at a splicing position. To obtain a smoother effect, image fusion may be performed on the n regional texture images through the following steps:

1. Calculate an average color of the n regional texture images.

In some embodiments, the step includes the following substeps:

1.1. For the $i^{th}$ regional texture image in the n regional texture images, sample a pixel value of at least one pixel from the valid region of the $i^{th}$ regional texture image, and calculate an average pixel value of the texture image of the $i^{th}$ region, where i is a positive integer less than or equal to n.

1.2. Calculate an average color of then regional texture images according to the average pixel value of then regional texture images.

2. Transform colors of the n regional texture images into the average color to obtain n transformed regional texture images.

3. Splice the n transformed regional texture images to generate a facial texture image.

Figure 17:
FIG. 17 is a schematic diagram of a facial texture image according to an embodiment of this application.

After the average color is obtained, the color of each regional texture image is transformed into the average color to obtain n transformed regional texture images. Then, the n transformed regional texture images are spliced to generate a facial texture image. In this way, the skin color in the finally generated facial texture image is smoother and more natural, and there is no obvious dividing line. For example, FIG. 17 is a schematic diagram of a facial texture image of a target object generated by fusing all the regional texture images in FIG. 16.

After the computing device generates the facial texture image of the target object, the facial texture image may be used to render the 3D facial mesh of the target object to generate a textured 3D facial mesh of the target object, and the process may include the following steps:

1. Obtain pixel values of pixels, which correspond to the 3D data points, on the facial texture image according to the index information 2. Render the 3D facial mesh according to the pixel values of the 3D data points, to generate a textured 3D facial mesh.

Figure 18:
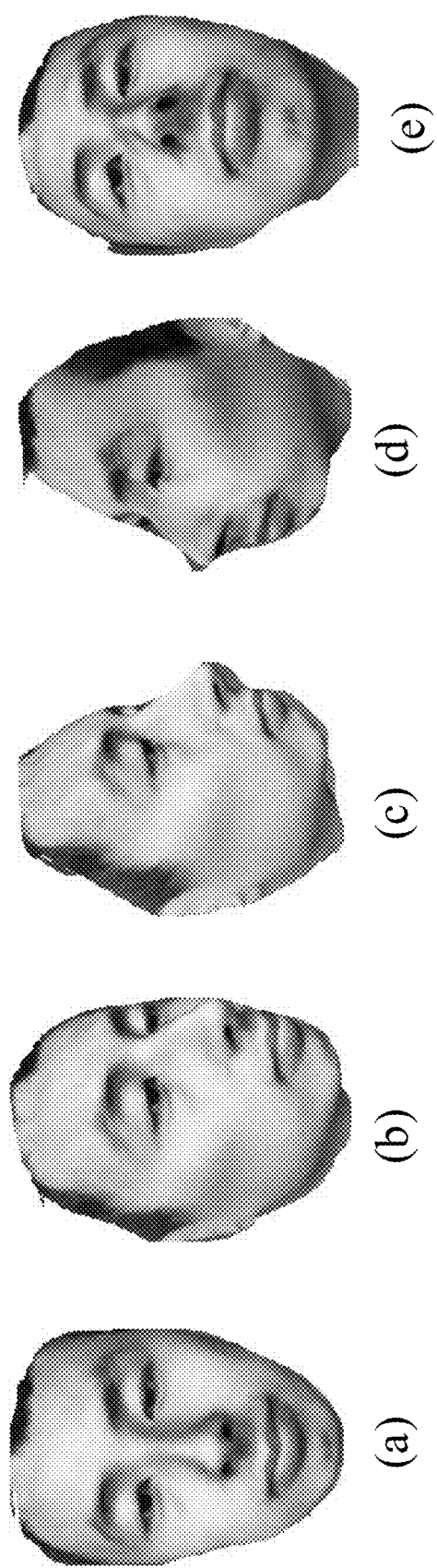
FIG. 18 is a schematic diagram of a textured 3D facial mesh according to an embodiment of this application.

For each 3D data point in the point cloud, a pixel value of a pixel, which corresponds to the 3D data point, on the facial texture image of the target object may be obtained according to the uv index corresponding to the 3D data point, to be used the pixel value of the 3D data point. In addition, a pixel value of each triangular patch in the 3D facial mesh may be represented by an average value of pixel values of three vertices of the triangular patch. In this way, the textured 3D facial mesh of the target object as shown in FIG. 18 may be generated by rendering. Part (a) in FIG. 18 is a schematic diagram of a 3D facial mesh in a front face posture. Part (b) in FIG. 18 and part (c) in FIG. 18 are schematic diagrams of a 3D facial mesh in a right side face posture. Part (d) in FIG. 18 is a schematic diagram of a 3D facial mesh in a left side face posture. Part (e) in FIG. 18 is a schematic diagram of a 3D facial mesh in a head-up posture.

In a possible application scenario, after the textured 3D facial mesh of the target object is generated, the 3D facial mesh may be driven to make different expressions, for example, different facial action effects such as opening the mouth, closing the mouth, blinking, or the like.

Using a voice interaction scenario as an example, after a to-be-played voice message is determined, an expression sequence corresponding to the voice information may be obtained, and the expression sequence includes at least one expression. When the voice message is played, the textured 3D facial mesh of the target object under each expression is sequentially displayed according to the sequence of all expressions included in the expression sequence. A mapping relationship between voice information and expression sequences may be stored in advance, and after the to-be-played voice information is determined, the expression sequence corresponding to the voice information may be found according to the mapping relationship. For example, a mapping relationship between pronunciations and expressions may be stored, and after the to-be-played voice information is determined, a pronunciation sequence corresponding to the voice information may be determined. The pronunciation sequence includes at least one pronunciation sequentially arranged, and the expression corresponding to each pronunciation is obtained, to obtain the expression sequence corresponding to the voice information.

In the foregoing manner, a solution for voice interaction based on a 3D face reconstructed mesh is implemented, and a matching expression may be displayed according to the voice played in real time, which is more realistic.

The following is an apparatus embodiment of this application, which can be used to perform the method embodiment of this application. For details not disclosed in the apparatus embodiments of this application, refer to the method embodiments of this application.

Figure 19:
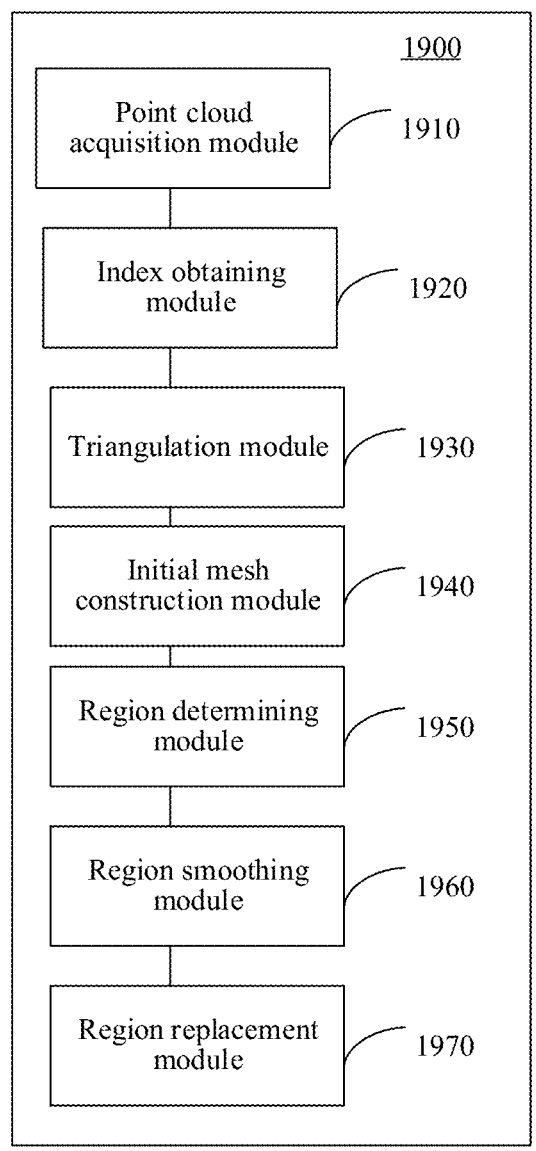
FIG. 19 is a block diagram of an apparatus for constructing a 3D facial mesh according to an embodiment of this application.

FIG. 19 is a block diagram of an apparatus for constructing a 3D facial mesh according to an embodiment of this application. The apparatus has functions for implementing the foregoing method embodiment. The functions may be implemented by hardware, or may be implemented by hardware executing corresponding software. The apparatus 1900 may include: a point cloud acquisition module 1910, an index obtaining module 1920, a triangulation module 1930, an initial mesh construction module 1940, a region determining module 1950, a region smoothing module 1960, and a region replacement module 1970.

The point cloud acquisition module 1910 is configured to obtain a facial point cloud of a target object.

The index obtaining module 1920 is configured to determine, through the expansion calculation, pixel coordinates on a facial texture image of the target object that correspond to 3D data points in the facial point cloud, as index information of the 3D data points.

The triangulation module 1930 is configured to perform triangulation on pixels on the facial texture image to obtain triangulation information, the triangulation information being used for indicating triangular topologies corresponding to the pixels.

The initial mesh construction module 1940 is configured to construct an initial 3D facial mesh according to the triangulation information, the index information, and the facial point cloud.

The region determining module 1950 is configured to determine a non-core region in the initial 3D facial mesh, the non-core region being a non-facial region in the initial 3D facial mesh.

The region smoothing module 1960 is configured to smooth the non-core region in the initial 3D facial mesh to obtain a smoothed non-core region.

The region replacement module 1970 is configured to replace the non-core region in the initial 3D facial mesh with the smoothed non-core region to obtain a 3D facial mesh of the target object.

In a schematic embodiment, the region determining module 1950 includes: a pixel determining unit, a topology determining unit, and a region determining unit (not shown in the figure).

The pixel determining unit is configured to determine non-facial key pixels in the facial texture image;

the topology determining unit is configured to determine non-facial key 3D data points and triangular topologies corresponding to the non-facial key 3D data points based on the non-facial key pixels, the triangulation information and the index information;

and the region determining unit is configured to determine a region formed by the triangular topologies corresponding to the non-facial key 3D data points as the non-core region.

In a schematic embodiment, the pixel determining unit is configured to:

determine a convex hull corresponding to a core region in the facial texture image, the core region being a region covered by facial key pixels in the facial texture image;

enlarge the convex hull based on a dilation threshold, to obtain a target region; and determine pixels in a region other than the target region in the facial texture image as the non-facial key pixels.

In a schematic embodiment, the apparatus further includes: a downsampling module (not shown in the figure).

The downsampling module is configured to downsample the facial point cloud to obtain a downsampled facial point cloud, where grid densities corresponding to a neck region and a non-neck region in the downsampled facial point cloud are different.

Then the index obtaining module 1920 is specifically configured to determine, through the expansion calculation, pixel coordinates on the facial texture image of the target object that correspond to 3D data points in the downsampled facial point cloud, to obtain the index information of the 3D data points.

In a schematic embodiment, the downsampled module is configured to:

define a plurality of grids corresponding to the neck region in a 3D space according to a first grid density, and define a plurality of grids corresponding to the non-neck region according to a second grid density;

fuse the facial point cloud into a plurality of grids in the 3D space; and average, under a same coordinate dimension, 3D coordinates of the 3D data points in the facial point cloud that are included in each grid, to obtain the downsampled facial point cloud.

In a schematic embodiment, the index obtaining module 1920 is configured to:

obtain 3D coordinates of the 3D data points in the facial point cloud in a 3D coordinate system; and determine, according to the 3D coordinates of the 3D data points through cylindrical expansion calculation, the pixel coordinates on the facial texture image that correspond to the 3D data points, to obtain the index information.

In a schematic embodiment, the apparatus further includes: an image obtaining module, a mapping obtaining module, a region obtaining module, a data point obtaining module, a pixel obtaining module, a pixel rendering module, and an image fusion module (not shown in the figure).

The image obtaining module is configured to obtain n face images corresponding to n head postures of the target object, n being a positive integer;

the mapping obtaining module is configured to obtain a mapping relationship between the 3D data point and pixels on each of the face images;

the region obtaining module is configured to respectively obtain image regions corresponding to the head postures from the n face images to obtain n valid regions;

the data point obtaining module is configured to obtain, for an $i^{th}$ valid region in the n valid regions, target 3D data points corresponding to pixels in the $i^{th}$ valid region according to the mapping relationship, i being a positive integer less than or equal to n;

the pixel obtaining module is configured to obtain target pixels, which correspond to the target 3D data points, on a regional texture image corresponding to the $i^{th}$ valid region according to the index information;

the pixel rendering module is configured to render the target pixels to generate the regional texture image corresponding to the $i^{th}$ valid region; pixel values of the target pixels being determined according to pixel values of the pixels in the $i^{th}$ valid region; and the image fusion module is configured to perform image fusion on the n regional texture images to generate the facial texture image of the target object.

In a schematic embodiment, the region obtaining module is configured to:

for the $i^{th}$ face image in the n face images, detect facial key points from the $i^{th}$ face image; and obtain a valid region in the $i^{th}$ face image according to positions of the facial key points and a predefined rule.

In a schematic embodiment, the apparatus further includes: a pixel value obtaining module and a mesh rendering module (not shown in the figure).

the pixel value obtaining module is configured to obtain pixel values of pixels, which correspond to the 3D data points, on the facial texture image according to the index information; and the model rendering module is configured to render the 3D facial mesh to generate a textured 3D facial mesh according to the pixel values of the 3D data points.

Figure 20:
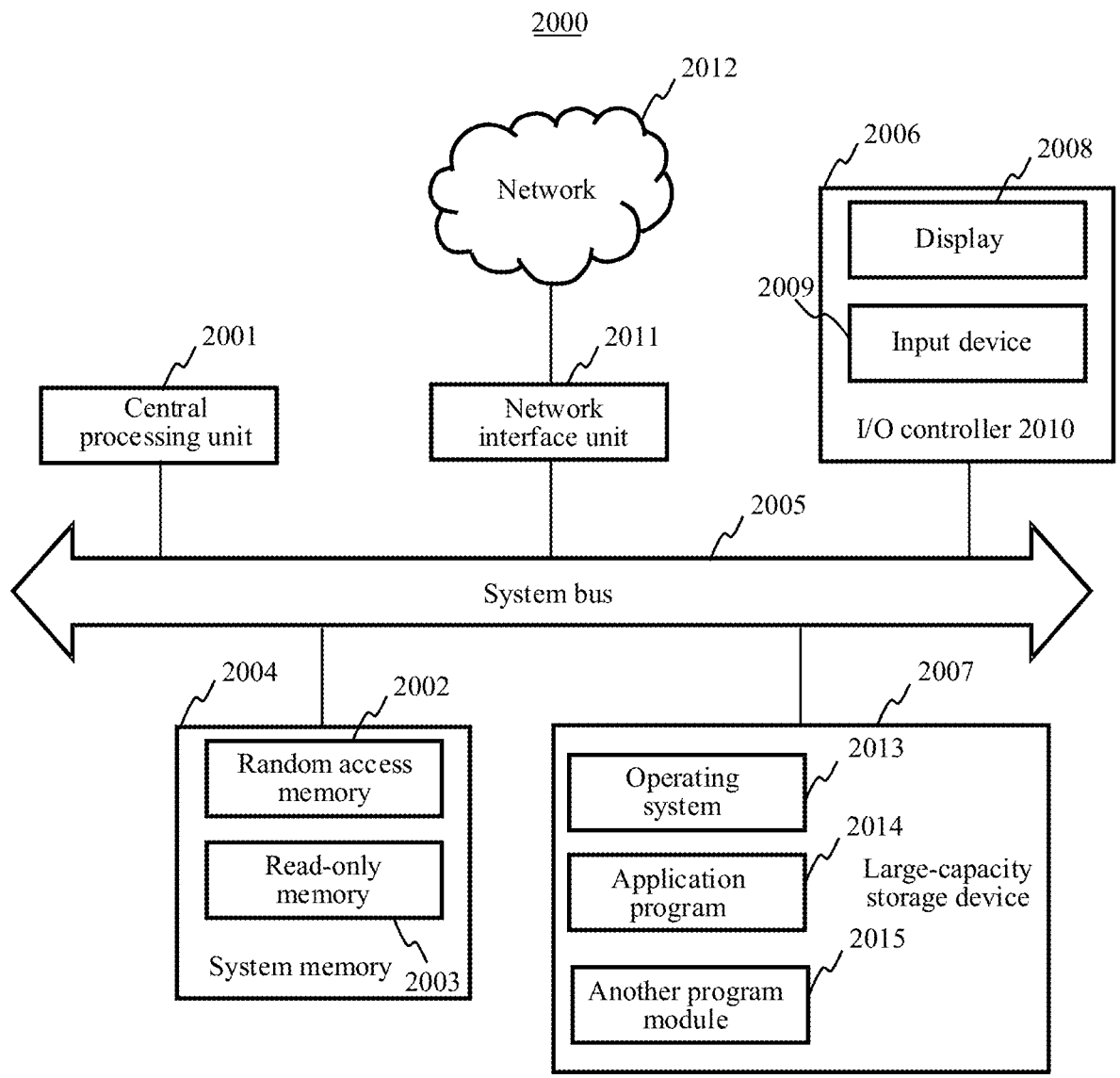
FIG. 20 is a schematic structural diagram of a computing device according to an embodiment of this application.

FIG. 20 is a schematic structural diagram of a computing device 2000 according to an embodiment of this application. The computing device 2000 is configured to perform the method for constructing a 3D facial mesh provided in the foregoing embodiment. Specifically:

the computing device 2000 includes a central processing unit (CPU) 2001, a system memory 2004 including a random access memory (RAM) 2002 and a read-only memory (ROM) 2003, and a system bus 2005 connecting the system memory 2004 and the central processing unit 2001. The computing device 2000 further includes a basic input/output system (I/O system) 2006 configured to transmit information between components in the computer, and a mass storage device 2007 configured to store an operating system 2013, an application program 2014, and another program module 2015.

The basic I/O system 2006 includes a display 2008 configured to display information and an input device 2009 such as a mouse or a keyboard that is used for inputting information by a user. The display 2008 and the input device 2009 are connected to an I/O controller 2010 of the system bus 2005, to be connected to the CPU 2001. The basic I/O system 2006 may further include the I/O controller 2010 to be configured to receive and process inputs from a plurality of other devices such as a keyboard, a mouse, and an electronic stylus. Similarly, the I/O controller 2010 further provides an output to a display screen, a printer, or another type of output device.

The mass storage device 2007 is connected to the CPU 2001 by using a mass storage controller (not shown) connected to the system bus 2005. The mass storage device 2007 and an associated computer-readable medium provide non-volatile storage for the computing device 2000. That is, the mass storage device 2007 may include a computer-readable medium (not shown) such as a hard disk or a compact disc ROM (CD-ROM) drive.

In general, the computer-readable medium may include a computer storage medium and a communications medium. The computer-storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory device, a CD-ROM, a digital versatile disc (DVD) or another optical memory, a tape cartridge, a magnetic cassette, a magnetic disk memory, or another magnetic storage device. Certainly, those skilled in the art may learn that the computer storage medium is not limited to the above. The foregoing system memory 2004 and mass storage device 2007 may be collectively referred to as a memory. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

According to the various embodiments of this application, the computing device 2000 may further be connected, through a network such as the Internet, to a remote computer on the network for running. That is, the computing device 2000 may be connected to a network 2012 by using a network interface unit 2011 connected to the system bus 2005, or may be connected to another type of network or a remote computer system (not shown) by using a network interface unit 2011.

The memory further includes one or more programs. The one or more programs are stored in the memory and configured to be executed by one or more processors. The one or more programs include instructions for implementing the foregoing method for constructing a 3D facial mesh on the computing device side.

In an exemplary embodiment, a terminal is further provided, including a processor and a memory, the memory storing at least one instruction, at least one program, a code set or an instruction set. The at least one instruction, the at least one program, the code set, or the instruction set is configured to be executed by one or more processors to implement the method for constructing a 3D facial mesh.

In an exemplary embodiment, a server is further provided, including a processor and a memory, the memory storing at least one instruction, at least one program, a code set or an instruction set. The at least one instruction, the at least one program, the code set, or the instruction set is configured to be executed by one or more processors to implement the method for constructing a 3D facial mesh.

In an exemplary embodiment, a computer-readable storage medium is further provided, the storage medium storing at least one instruction, at least one program, a code set or an instruction set, and the at least one instruction, the at least one program, the code set or the instruction set being executed by the processor of a computing device to implement the method for constructing a 3D facial mesh.

In an exemplary embodiment, a computer program product or a computer program is provided, the computer program product or the computer program including computer instructions, the computer instructions being stored in a computer-readable storage medium. A processor of a computing device reads the computer instructions from the computer-readable storage medium, and executes the computer instructions, so that the computing device performs the method for constructing a 3D facial mesh provided in the foregoing embodiment or various optional implementations of the foregoing embodiment.

What is claimed is:

1. A method for constructing a three-dimensional (3D) facial mesh, performed by a computing device, the method comprising:
    obtaining a facial point cloud of a target object;
    generating a facial texture image of the target object from the facial point cloud and n face images corresponding to n head postures of the target object, n being a positive number;
    performing grid downsampling on the facial point cloud to obtain a downsampled facial point cloud;
    determining, through an expansion calculation, pixel coordinates on the facial texture image of the target object that correspond to 3D data points in the downsampled facial point cloud as index information of the 3D data points;
    performing triangulation on pixels on the facial texture image to obtain triangulation information, the triangulation information being used for indicating triangular topologies corresponding to the pixels;
    constructing an initial 3D facial mesh according to the triangulation information, the index information and the downsampled facial point cloud;
    determining a non-core region in the initial 3D facial mesh, the non-core region being a non-facial region in the initial 3D facial mesh;
    smoothing the non-core region in the initial 3D facial mesh to obtain a smoothed non-core region; and
    replacing the non-core region in the initial 3D facial mesh with the smoothed non-core region to obtain a 3D facial mesh of the target object.

2. The method according to claim 1, wherein the determining the non-core region in the initial 3D facial mesh comprises:
    determining non-facial key pixels in the facial texture image;
    determining non-facial key 3D data points and triangular topologies corresponding to the non-facial key 3D data points based on the non-facial key pixels, the triangulation information and the index information; and
    determining a region formed by the triangular topologies corresponding to the non-facial key 3D data points as the non-core region.

3. The method according to claim 2, wherein the determining the non-facial key pixels in the facial texture image comprises:
    determining a convex hull corresponding to a core region in the facial texture image, the core region being a region covered by facial key pixels in the facial texture image;
    enlarging the convex hull based on a dilation threshold to obtain a target region; and
    determining pixels in a region other than the target region in the facial texture image as the non-facial key pixels.

4. The method according to claim 1, wherein the performing grid downsampling on the facial point cloud to obtain the downsampled facial point cloud comprises:
    defining a plurality of grids corresponding to the non-core region in a 3D space according to a first grid density, and defining a plurality of grids corresponding to the core region according to a second grid density;
    fusing the facial point cloud into a plurality of grids in the 3D space; and
    averaging, under a same coordinate dimension, 3D coordinates of 3D data points in the facial point cloud included in each grid to obtain the downsampled facial point cloud.

5. The method according to claim 1, wherein the determining, through the expansion calculation, the pixel coordinates on the facial texture image of the target object that correspond to 3D data points in the downsampled facial point cloud as the index information of the 3D data points comprises:
    obtaining 3D coordinates of the 3D data points in the downsampled facial point cloud in a 3D coordinate system; and
    determining, according to the 3D coordinates of the 3D data points through a cylindrical expansion calculation, the pixel coordinates on the facial texture image that correspond to the 3D data points, as the index information.

6. The method according to claim 1, wherein the generation of the facial texture image further comprises:
obtaining a mapping relationship between the 3D data points in the facial point cloud and pixels on each of the n face images;
respectively obtaining image regions corresponding to the head postures from the n face images to obtain n valid regions;
for an $i^{th}$ valid region in the n valid regions, obtaining target 3D data points corresponding to pixels in the $i^{th}$ valid region according to the mapping relationship, i being a positive integer less than or equal to n;
obtaining target pixels, which are on a regional texture image corresponding to the $i^{th}$ valid region, corresponding to the target 3D data points according to the index information;
rendering the target pixels to generate the regional texture image corresponding to the $i^{th}$ valid region, pixel values of the target pixels being determined according to pixel values of the pixels in the $i^{th}$ valid region; and
performing image fusion on the n regional texture images to generate the facial texture image of the target object.

7. The method according to claim 6, wherein the respectively obtaining image regions corresponding to the head postures from the n face images to obtain the n valid regions comprises:
for the $i^{th}$ face image in the n face images, detecting facial key points in the $i^{th}$ face image; and
obtaining a valid region in the $i^{th}$ face image according to positions of the facial key points and a predefined rule.

8. The method according to claim 6, after the performing image fusion on the n regional texture images to generate the facial texture image of the target object, the method further comprising:
obtaining according to the index information, pixel values of pixels, which correspond to the 3D data points, on the facial texture image; and
rendering the 3D facial mesh according to the pixel values of the 3D data points, to generate a textured 3D facial mesh.

9. A computing device, comprising a processor and a memory, the memory storing at least one instruction, at least one program, a code set or an instruction set, the at least one instruction, the at least one program, the code set or the instruction set being loaded and executed by the processor to implement a method for constructing a three-dimensional (3D) facial mesh, the method comprising:
obtaining a facial point cloud of a target object;
generating a facial texture image of the target object from the facial point cloud and n face images corresponding to n head postures of the target object, n being a positive number;
performing grid downsampling on the facial point cloud to obtain a downsampled facial point cloud;
determining, through an expansion calculation, pixel coordinates on the facial texture image of the target object that correspond to 3D data points in the downsampled facial point cloud as index information of the 3D data points;
performing triangulation on pixels on the facial texture image to obtain triangulation information, the triangulation information being used for indicating triangular topologies corresponding to the pixels;
constructing an initial 3D facial mesh according to the triangulation information, the index information and the downsampled facial point cloud;
determining a non-core region in the initial 3D facial mesh, the non-core region being a non-facial region in the initial 3D facial mesh;
smoothing the non-core region in the initial 3D facial mesh to obtain a smoothed non-core region; and
replacing the non-core region in the initial 3D facial mesh with the smoothed non-core region to obtain a 3D facial mesh of the target object.

10. The computing device according to claim 9, wherein the determining the non-core region in the initial 3D facial mesh comprises:
determining non-facial key pixels in the facial texture image;
determining non-facial key 3D data points and triangular topologies corresponding to the non-facial key 3D data points based on the non-facial key pixels, the triangulation information and the index information; and
determining a region formed by the triangular topologies corresponding to the non-facial key 3D data points as the non-core region.

11. The computing device according to claim 10, wherein the determining the non-facial key pixels in the facial texture image comprises:
determining a convex hull corresponding to a core region in the facial texture image, the core region being a region covered by facial key pixels in the facial texture image;
enlarging the convex hull based on a dilation threshold to obtain a target region; and
determining pixels in a region other than the target region in the facial texture image as the non-facial key pixels.

12. The computing device according to claim 9, wherein the performing grid downsampling on the facial point cloud to obtain the downsampled facial point cloud comprises:
defining a plurality of grids corresponding to the non-core region in a 3D space according to a first grid density, and defining a plurality of grids corresponding to the core region according to a second grid density;
fusing the facial point cloud into a plurality of grids in the 3D space; and
averaging, under a same coordinate dimension, 3D coordinates of 3D data points in the facial point cloud included in each grid to obtain the downsampled facial point cloud.

13. The computing device according to claim 9, wherein the determining, through the expansion calculation, the pixel coordinates on the facial texture image of the target object that correspond to 3D data points in the downsampled facial point cloud as the index information of the 3D data points comprises:
obtaining 3D coordinates of the 3D data points in the downsampled facial point cloud in a 3D coordinate system; and
determining, according to the 3D coordinates of the 3D data points through a cylindrical expansion calculation, the pixel coordinates on the facial texture image that correspond to the 3D data points, as the index information.

14. The computing device according to claim 9, wherein the generation of the facial texture image further comprises:
obtaining a mapping relationship between the 3D data points in the facial point cloud and pixels on each of the n face images;

respectively obtaining image regions corresponding to the head postures from the n face images to obtain n valid regions;

for an $i^{th}$ valid region in the n valid regions, obtaining target 3D data points corresponding to pixels in the $i^{th}$ valid region according to the mapping relationship, i being a positive integer less than or equal to n;

obtaining target pixels, which are on a regional texture image corresponding to the $i^{th}$ valid region, corresponding to the target 3D data points according to the index information;

rendering the target pixels to generate the regional texture image corresponding to the $i^{th}$ valid region, pixel values of the target pixels being determined according to pixel values of the pixels in the $i^{th}$ valid region; and performing image fusion on the n regional texture images to generate the facial texture image of the target object.

15. The computing device according to claim 14, wherein the respectively obtaining image regions corresponding to the head postures from the n face images to obtain the n valid regions comprises:

for the $i^{th}$ face image in the n face images, detecting facial key points in the $i^{th}$ face image; and obtaining a valid region in the $i^{th}$ face image according to positions of the facial key points and a predefined rule.

16. The computing device according to claim 14, wherein after the performing image fusion on the n regional texture images to generate the facial texture image of the target object, the method further comprises:

obtaining according to the index information, pixel values of pixels, which correspond to the 3D data points, on the facial texture image; and rendering the 3D facial mesh according to the pixel values of the 3D data points, to generate a textured 3D facial mesh.

17. A non-transitory computer-readable storage medium, storing at least one instruction, at least one program, a code set or an instruction set, and the at least one instruction, the at least one program, the code set or the instruction set being loaded and executed by a processor to implement a method for constructing a three-dimensional (3D) facial mesh, the method comprising:

obtaining a facial point cloud of a target object;

generating a facial texture image of the target object from the facial point cloud and n face images corresponding to n head postures of the target object, n being a positive number;

performing grid downsampling on the facial point cloud to obtain a downsampled facial point cloud;

determining, through an expansion calculation, pixel coordinates on the facial texture image of the target object that correspond to 3D data points in the downsampled facial point cloud as index information of the 3D data points;

performing triangulation on pixels on the facial texture image to obtain triangulation information, the triangulation information being used for indicating triangular topologies corresponding to the pixels;

constructing an initial 3D facial mesh according to the triangulation information, the index information and the downsampled facial point cloud;

determining a non-core region in the initial 3D facial mesh, the non-core region being a non-facial region in the initial 3D facial mesh;

smoothing the non-core region in the initial 3D facial mesh to obtain a smoothed non-core region; and replacing the non-core region in the initial 3D facial mesh with the smoothed non-core region to obtain a 3D facial mesh of the target object.

18. The non-transitory computer-readable storage medium according to claim 17, wherein the determining the non-core region in the initial 3D facial mesh comprises:

determining non-facial key pixels in the facial texture image;

determining non-facial key 3D data points and triangular topologies corresponding to the non-facial key 3D data points based on the non-facial key pixels, the triangulation information and the index information; and determining a region formed by the triangular topologies corresponding to the non-facial key 3D data points as the non-core region.

19. The non-transitory computer-readable storage medium according to claim 17, wherein the performing grid downsampling on the facial point cloud to obtain the downsampled facial point cloud comprises:

defining a plurality of grids corresponding to the non-core region in a 3D space according to a first grid density, and defining a plurality of grids corresponding to the core region according to a second grid density;

fusing the facial point cloud into a plurality of grids in the 3D space; and averaging, under a same coordinate dimension, 3D coordinates of 3D data points in the facial point cloud included in each grid to obtain the downsampled facial point cloud.

20. The non-transitory computer-readable storage medium according to claim 17, wherein the determining, through the expansion calculation, the pixel coordinates on the facial texture image of the target object that correspond to 3D data points in the downsampled facial point cloud as the index information of the 3D data points comprises:

obtaining 3D coordinates of the 3D data points in the downsampled facial point cloud in a 3D coordinate system; and determining, according to the 3D coordinates of the 3D data points through a cylindrical expansion calculation, the pixel coordinates on the facial texture image that correspond to the 3D data points, as the index information.

* * * * *